(12) United States Patent
Kunimitsu et al.

(10) Patent No.: US 12,101,229 B2
(45) Date of Patent: Sep. 24, 2024

(54) GENERATION OF DATA PACKETS FOR HIGH SPEED NETWORK TESTING USING RANGE VARIABLE FIELD MODIFIERS

(71) Applicant: Spirent Communications, Inc., San Jose, CA (US)

(72) Inventors: Jocelyn Kunimitsu, Aiea, HI (US); Craig Fujikami, Honolulu, HI (US)

(73) Assignee: Spirent Communications, Inc., San Jose, CA (US)

( * ) Notice: Subject to any disclaimer, the term of this patent is extended or adjusted under 35 U.S.C. 154(b) by 287 days.

(21) Appl. No.: 17/531,468

(22) Filed: Nov. 19, 2021

(65) Prior Publication Data

US 2022/0166680 A1 May 26, 2022

Related U.S. Application Data

(60) Provisional application No. 63/117,279, filed on Nov. 23, 2020.

(51) Int. Cl.
*H04L 41/14* (2022.01)
*H04L 43/106* (2022.01)

(52) U.S. Cl.
CPC .......... *H04L 41/145* (2013.01); *H04L 43/106* (2013.01)

(58) Field of Classification Search
CPC . H04L 63/1433; H04L 67/02; H04L 63/1441; H04L 41/12; H04L 41/145; H04L 43/0852; H04L 63/02; H04L 67/34; H04L 67/125; H04L 67/52; H04L 67/60; H04L 41/0631; H04L 63/029; H04L 41/142;
(Continued)

(56) References Cited

U.S. PATENT DOCUMENTS 5,608,872 A 3/1997 Schwartz et al.
5,995,753 A 11/1999 Walker
(Continued)

FOREIGN PATENT DOCUMENTS

EP 555382 B1 * 3/1996 ............... G06F 5/10
EP 2512066 A1 10/2012
(Continued)

OTHER PUBLICATIONS

Spirent Axon, "Spirent.RTM. Axon, Easy. Affordable Practical, brochure" 2013, Spirent Communications, Inc., 4 pages.
(Continued)

*Primary Examiner* — Omer S Mian
(74) *Attorney, Agent, or Firm* — Haynes Beffel & Wolfeld LLP; Andrew L. Dunlap; Franklin M. Schellenberg

(57) ABSTRACT

The disclosed technology teaches techniques for generating a high quantity of internet traffic flows, such as in the form of data packets, to stress test network components by using range variable field modifiers. The techniques generate a large scale of flows at a relatively fast speed by using a process that may involve a finite state machine feedback loop and a multiple range variable field modifier process. Start and end range pointers for range entries of data packet modifiers are stored in memory and used with pointer and counter values, which are varied and updated in a relatively fast feedback loop. Data packet modifiers may be selected based on the pointer and counter values and are used to modify or generate data packets.

20 Claims, 11 Drawing Sheets

(58) Field of Classification Search
CPC ..... H04L 43/0894; H04L 43/12; H04L 43/06; H04L 41/22; H04L 63/145; H04L 41/0213; H04L 43/106; H04L 69/16; H04L 41/147; H04L 61/5014; H04L 69/22; H04L 2101/622; H04L 41/0823; H04L 43/0888; H04L 43/16; H04L 45/00; H04L 45/14; H04L 47/11; H04L 47/22; H04L 61/5038; H04L 63/1425; H04L 67/10; H04L 67/104; H04L 69/329; H04L 69/40; H04L 9/0637; H04L 9/40; H04L 12/4641; H04L 41/40; H04L 41/5003; H04L 43/022; H04L 43/04; H04L 43/08; H04L 43/0811; H04L 43/0817; H04L 43/10; H04L 45/7453; H04L 49/555; H04L 63/0209; H04L 63/0254; H04L 63/0281; H04L 63/0407; H04L 63/08; H04L 63/0876

See application file for complete search history.

(56) References Cited

U.S. PATENT DOCUMENTS

| | | | |
|---|---|---|---|
| 6,031,990 | A | 2/2000 | Sivakumar et al. |
| 6,078,953 | A | 6/2000 | Vaid et al. |
| 6,167,534 | A | 12/2000 | Straathof et al. |
| 6,219,829 | B1 | 4/2001 | Sivakumar et al. |
| 6,240,458 | B1 | 5/2001 | Gilbertson |
| 6,252,891 | B1 | 6/2001 | Perches |
| 6,473,794 | B1 | 10/2002 | Guheen et al. |
| 6,519,714 | B1 | 2/2003 | Sweet et al. |
| 6,530,065 | B1 | 3/2003 | McDonald et al. |
| 6,654,701 | B2 | 11/2003 | Hatley |
| 6,728,929 | B1 | 4/2004 | Luong |
| 6,823,380 | B1 | 11/2004 | Nace et al. |
| 6,892,236 | B1 | 5/2005 | Conrad et al. |
| 7,016,340 | B1 | 3/2006 | McKinion |
| 7,158,907 | B1 | 1/2007 | Soldo |
| 7,162,377 | B2 | 1/2007 | Amrod et al. |
| 7,181,360 | B1 | 2/2007 | Nikolac et al. |
| 7,272,114 | B1 | 9/2007 | Barkan |
| 7,296,190 | B2 | 11/2007 | Vakrat et al. |
| 7,437,450 | B1 | 10/2008 | Gore et al. |
| 7,581,006 | B1 | 8/2009 | Lara et al. |
| 7,594,159 | B2 | 9/2009 | Fujikami et al. |
| 7,647,219 | B2 | 1/2010 | Overturf et al. |
| 7,826,381 | B1 | 11/2010 | Kastuar et al. |
| 7,869,381 | B1 * | 1/2011 | Hatley ............... H04L 43/50 370/252 |
| 7,957,323 | B2 | 6/2011 | Uyehara et al. |
| 8,102,776 | B2 | 1/2012 | Fujikami et al. |
| 8,281,187 | B1 | 10/2012 | Desai et al. |
| 8,326,970 | B2 | 12/2012 | Cherkasova et al. |
| 8,977,739 | B2 | 3/2015 | Troup |
| 8,996,920 | B2 | 3/2015 | Fattah |
| 9,262,409 | B2 | 2/2016 | Anisimovich et al. |
| 9,325,601 | B2 | 4/2016 | Fujikami et al. |
| 9,361,197 | B2 | 6/2016 | Kunimitsu et al. |
| 9,727,449 | B2 | 8/2017 | Hermeto et al. |
| 10,048,894 | B2 | 8/2018 | Kunimitsu et al. |
| 10,621,075 | B2 | 4/2020 | Buege |
| 11,374,973 | B2 | 6/2022 | Yang et al. |
| 2002/0091509 | A1 | 7/2002 | Zoarez et al. |
| 2002/0138226 | A1 | 9/2002 | Doane |
| 2002/0198984 | A1 | 12/2002 | Goldstein et al. |
| 2003/0051064 | A1 | 3/2003 | Curtis |
| 2003/0065986 | A1 | 4/2003 | Fraenkel et al. |
| 2003/0074407 | A1 | 4/2003 | Zhang et al. |
| 2003/0074606 | A1 | 4/2003 | Boker |
| 2003/0091165 | A1 | 5/2003 | Bearden et al. |
| 2003/0120464 | A1 | 6/2003 | Taft et al. |
| 2003/0233445 | A1 | 12/2003 | Levy et al. |
| 2004/0030747 | A1 | 2/2004 | Oppermann |
| 2004/0054728 | A1 | 3/2004 | Rust |
| 2004/0103189 | A1 | 5/2004 | Cherkasova et al. |
| 2004/0111727 | A1 | 6/2004 | Schwarzbauer et al. |
| 2004/0190519 | A1 | 9/2004 | Dugatkin |
| 2004/0240440 | A1 | 12/2004 | Wild et al. |
| 2005/0177613 | A1 | 8/2005 | Dresden |
| 2005/0229162 | A1 | 10/2005 | Tanner |
| 2005/0240799 | A1 | 10/2005 | Manfredi et al. |
| 2006/0039538 | A1 | 2/2006 | Minnis et al. |
| 2006/0045021 | A1 | 3/2006 | Deragon et al. |
| 2006/0047794 | A1 | 3/2006 | Jezierski |
| 2006/0200520 | A1 | 9/2006 | Vernon et al. |
| 2007/0078943 | A1 | 4/2007 | Daniels et al. |
| 2007/0100782 | A1 | 5/2007 | Reed et al. |
| 2007/0169563 | A1 | 7/2007 | Hohjo et al. |
| 2008/0031151 | A1 | 2/2008 | Williams |
| 2008/0072050 | A1 | 3/2008 | Klonover et al. |
| 2008/0162690 | A1 | 7/2008 | Karagounis |
| 2008/0172581 | A1 | 7/2008 | Glas et al. |
| 2008/0198742 | A1 | 8/2008 | Kaempfer |
| 2008/0244315 | A1 | 10/2008 | Johnson |
| 2008/0270401 | A1 | 10/2008 | Petersen et al. |
| 2008/0270845 | A1 | 10/2008 | Petersen et al. |
| 2008/0270847 | A1 | 10/2008 | Connally et al. |
| 2008/0320076 | A1 | 12/2008 | Silvert |
| 2009/0083390 | A1 | 3/2009 | Abu-Ghazaleh et al. |
| 2009/0089863 | A1 | 4/2009 | Vanniarajan |
| 2009/0119301 | A1 | 5/2009 | Cherkasova et al. |
| 2010/0061378 | A1 | 3/2010 | Joyner et al. |
| 2010/0088549 | A1 | 4/2010 | Duffield et al. |
| 2010/0153529 | A1 | 6/2010 | Moser |
| 2010/0269044 | A1 | 10/2010 | Ivanyi et al. |
| 2010/0281208 | A1 | 11/2010 | Yang |
| 2010/0333072 | A1 | 12/2010 | Dulip et al. |
| 2011/0015917 | A1 | 1/2011 | Wang et al. |
| 2011/0054878 | A1 | 3/2011 | Zhang et al. |
| 2011/0214157 | A1 | 9/2011 | Korsunsky et al. |
| 2012/0137059 | A1 | 5/2012 | Yang et al. |
| 2012/0173870 | A1 | 7/2012 | Reddy et al. |
| 2012/0246310 | A1 | 9/2012 | Broda et al. |
| 2013/0088977 | A1 | 4/2013 | Baillargeon |
| 2013/0138827 | A1 * | 5/2013 | Loach ............... H04L 47/193 709/230 |
| 2013/0198391 | A1 | 8/2013 | Weissblum |
| 2013/0226967 | A1 | 8/2013 | Gross et al. |
| 2013/0275585 | A1 | 10/2013 | Santhanakrishnan et al. |
| 2013/0282545 | A1 | 10/2013 | Gounares et al. |
| 2013/0346719 | A1 | 12/2013 | Tomlinson et al. |
| 2014/0019560 | A1 | 1/2014 | Li et al. |
| 2014/0019804 | A1 | 1/2014 | Buege et al. |
| 2014/0289418 | A1 | 9/2014 | Cohen et al. |
| 2014/0297850 | A1 | 10/2014 | Duffield et al. |
| 2015/0120914 | A1 | 4/2015 | Wada et al. |
| 2016/0034381 | A1 | 2/2016 | Keret et al. |
| 2016/0147643 | A1 | 5/2016 | Hamon |
| 2016/0191349 | A1 | 6/2016 | Buege |
| 2017/0208560 | A1 | 7/2017 | Papa et al. |
| 2017/0263332 | A1 | 9/2017 | Kapoor |
| 2019/0182129 | A1 * | 6/2019 | Canady ............... H04L 43/06 |

FOREIGN PATENT DOCUMENTS

| | | | |
|---|---|---|---|
| WO | 2009032281 | A3 | 4/2009 |
| WO | 2017053961 | A1 | 3/2017 |

OTHER PUBLICATIONS

Spirent, "Test Reference—Network Infrastructure Tests," Jun. 26, 2014, Spirent Communications, Inc., <https://support.spirentforbusiness.com/support/solutions/articles/1000009746-test> Retrieves, Oct. 11, 2014, 17 pages.

Spirent Axon, "Application Note—Testing Made Simple," 2014, Spirent Commuincations, Inc., <www.spirent.com>, pp. 1-18.

Spirent, "Support: Spirent Enterprise Customer Portal," 2014, Spirent Communications, Inc., <https://support.spirentforbusiness.com/support/home>, retrieved Oct. 11, 2014, 5 pages.

Spirent, "Enable the new Traffic Recorder (beta): Spirent Enterprise Customer Portal," Jun. 26, 2014, Spirent Communications, Inc.,

(56) References Cited

OTHER PUBLICATIONS

<https://support.spirentforbusiness.com/support/solutions/articles/100-0026580-enable-the-new-traffic-recorder>, Retrieved Oct. 12, 2014, 1 page.
Spirent, "How to enable the NetFlow probe: Spirent Enterprise Customer Portal," Apr. 2, 2014, Spirent communications, Inc., <https://support.spirentforbusiness.com/support/solutions/articles/100- 0020325-how-to-enable-the-netflow>, RetrievedOct. 12, 2014, 2 pages.
Gao, "Cloud Testing—Issues, Challenges, Needs and Practice", Sep. 2011, Software engineering: an International Journal, vol. 1 No. 1 p. 9-23.
Domenech, "An Experimental framework for testing web prefetching techniques", 2004, Polytechnic University of Valencia, p. 1-8.
Spirent Communications, Reference Manual: Spirent TestCenter System, Aug. 2006, pp. 1-133.

* cited by examiner

GENERATION OF DATA PACKETS FOR HIGH SPEED NETWORK TESTING USING RANGE VARIABLE FIELD MODIFIERS

RELATED APPLICATIONS

This application is related to U.S. patent application Ser. No. 63/117,279 filed on Nov. 23, 2020 and entitled "Generation of Data Packets For High Speed Network Testing Using Range Variable Field Modifiers" and is hereby incorporated by reference for all purposes

TECHNICAL FIELD

The present disclosure relates to generating a high quantity of internet traffic flows to stress test network components by using range variable field modifiers.

BACKGROUND

When testing network components, generating a large scale of unique flows at high rates is one way to stress the network. Emulating a large scale of internet traffic flows might require varying multiple fields such as the MAC or IP source and destination addresses within a packet header of a packet. Each packet contains both a header (e.g., 20 or 24 bytes long) and data (variable length). The header includes the IP addresses of the source and destination, plus other fields that help to route the packet. The data is the actual content, such as a string of letters or part of a webpage.

Range Variable Field Modifiers that can overlay the fields have been a useful way to generate a high number of internet flows. As the speeds of network components increase, the overall number of flows to stress the network will also need to increase. However, RAM resources and required bandwidth make it difficult to generate large sets of valid ranges of traffic flows to thoroughly stress the network.

Specifically, testing of network components (e.g., routers) in a 400 GbE network has proven to be difficult, because the generation of test internet data flows that stress the high speed network is difficult to create within the timing constraints of an FPGA.

For example, for 400 GbE data rates, the maximum frame rate is 400 GbE/(8 bits*(12-byte inter-frame gap+8 byte preamble+64 byte frame)), which is over 595 million frames per second (e.g., for 400 GbE rates a packet will need to be generated every 1.68 ns). Conventional circuitry that has been able to handle lower speeds cannot handle the generation of data packets at such speeds.

RAM that requires reading-modifying-writing back at 595 million frames a second is especially difficult if it requires strict ordering. For example, on Xilinx Ultrascale FPGA parts, True Dual Port Block RAMs have a maximum frequency of 525 MHz and 585 MHz at the lower speed grades. Only the most expensive, highest speed grade claims to run at 660 MHz, but this also requires pipeline delays on the read path to get to this speed, thus requiring extra processing to handle ordering, as well as the update and write back to the other port of the dual port RAM. Circuitry this speed will still have difficulty meeting the required timing or limiting the complexity of the type of counters that can be supported. Further, any design that requires the output of a RAM read to determine where the next read to the same RAM within one frame time further exacerbates the timing requirements of a feedback loop that would be used to continuously generate the data packets.

Therefore, a need arises to provide a way to generate more ranges and a larger scale of flows at a faster speed to stress high-speed network components using RAMs that have a read and update time that is too slow to handle the maximum frame rate packet time.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
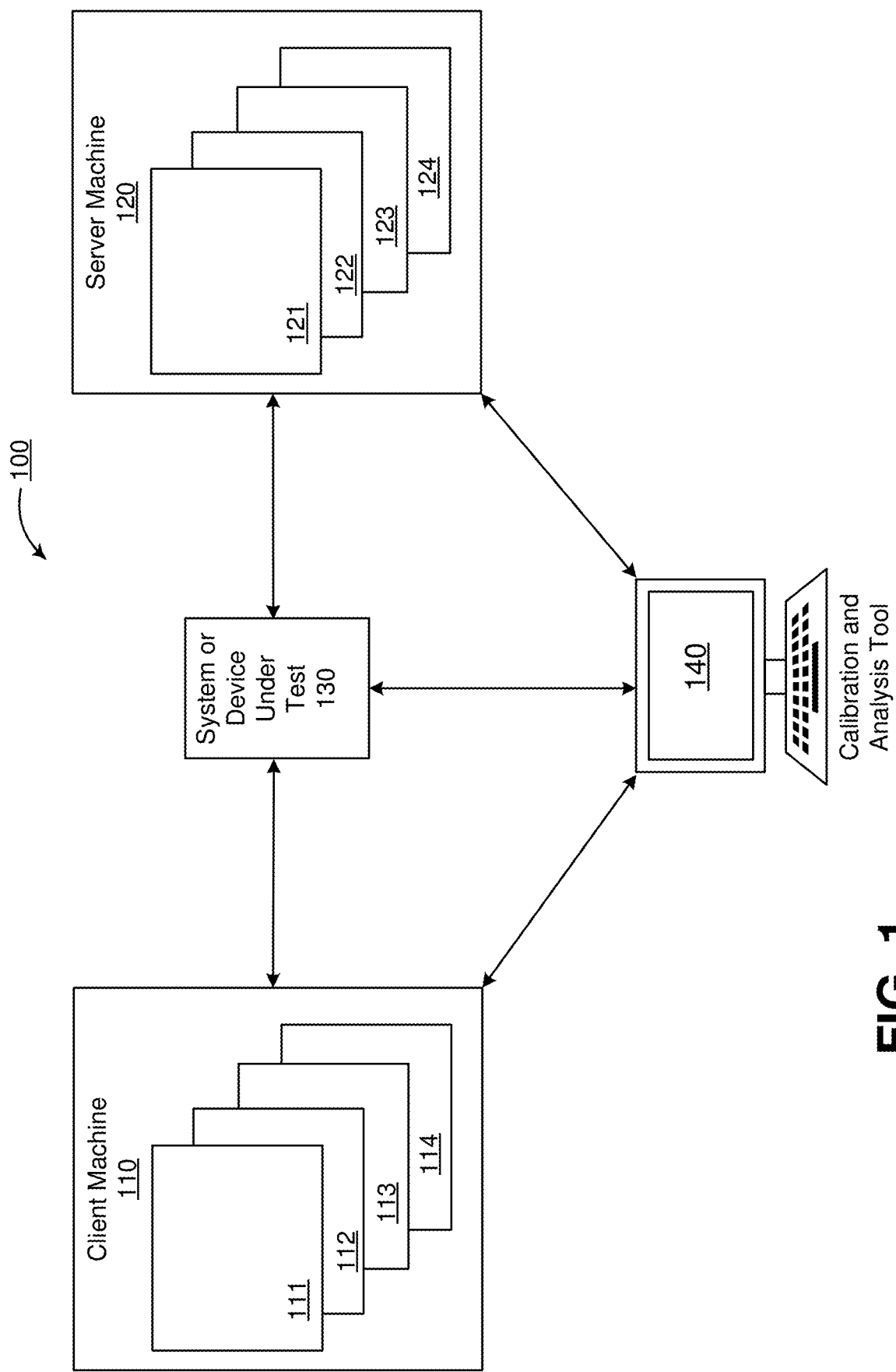
FIG. 1 illustrates a test system for testing a system or device under test ("DUT"), which sits between a plurality of client state machines running on a client machine and a plurality of server state machines running on a server machine.

Aspects of the present disclosure relate to high-speed generation of data packets used to test high speed network components using range variable field modifiers. In some embodiments, a method of generating data packets (e.g., generating IP addresses to include in data packets) for network stress testing, includes storing in a memory one or more sets of ranges of data packet modifiers. Respective start and end range pointers for each of the ranges of data packet modifiers may also be stored in the memory. The method also includes reading from the memory the respective start and end range pointers for each of the ranges of the data packet modifiers in each of the sets of ranges, setting a pointer value, and varying a counter value. For example, the counter value may be incremented or decremented by one or more. When the counter value is not between the start and end range pointers of a particular one of the ranges of data packet modifiers corresponding to the pointer value, then the method includes incrementing the pointer value to a corrected pointer value that corresponds to one of the ranges of data packet modifiers that has start and end range pointers that encompass the counter value. Next, the method includes generating or modifying at least a portion of a data packet (e.g., the payload portion of the data packet or the address portion of the data packet, such as an IP address, mac address, L4 address, or MPLS or VLAN tags) based on the corrected pointer value and the counter value.

In some embodiments, generating or modifying the at least a portion of the data packet based on the corrected pointer value and the counter value further comprises using the corrected pointer value and the counter value to retrieve from the memory a particular data packet modifier among the one or more sets of ranges, and generating or modifying the at least a portion of the data packet based on the particular data packet modifier.

In some embodiments, generating or modifying the at least a portion of the data packet based on the corrected pointer value and the counter value further comprises combining, via a mathematical operation, the counter value and a particular data packet modifier corresponding to the corrected pointer value to generate or modify the at least a portion of the data packet. For example, the combining, via the mathematical operation, may generate an address to a lookup table stored in the memory. In such a case, the method may further comprise, based on the address, retrieving from the memory a particular value from the lookup table, and modifying the at least a portion of the data packet based on the particular value. In some implementations, the counter values may be updated to become the actual modifier values, based on information for a corresponding range (e.g. by setting a mode, adding or subtracting offsets, by scaling/multiplication, or repeating the same value for the entirety of a range), or the counter values may correspond to addresses to a lookup table containing random values. For example, in some implementations, a modal input value (e.g., received from a user on the fly, or received from memory) may determine the mathematical operation to be used.

In some embodiments, the counter value may be compared to a threshold value (e.g., herein called a recycle count value), as described below. When the counter value exceeds the threshold value, then the counter value may be reset to an initial value and the method described above may be cyclically repeated FIG. 1 illustrates a test system 100 for testing a system or device under test ("DUT") that sits between a plurality of client state machines running on a client machine and a plurality of server state machines running on a server machine. Test system 100 includes a client machine 110, a server machine 120, and a calibration and analysis tool 140. These components of test system 100 are for testing the "System or Device" under test, hereinafter referred to as the DUT 130.

DUT 130 can be any device that is capable of passing information between a server and a client, a client and a client, or a server and a server. Typically, DUT 130 will be a switching device a bridging device or a routing device. Using the technology disclosed in the present application, test system 100 establishes and negotiates HTTPS sessions (e.g., or other type of network traffic) between client machine 110 and server machine 120 in order to test the throughput and reliability of DUT 130. While data is being transmitted through DUT 130, DUT 130 itself can be performing deep packet inspection (DPI) of the data as it passes through DUT 130. The DPI will typically only be performed during the handshaking process (e.g., the first phase, as described below with reference to FIG. 2, as opposed to during the second phase) and can be performed on the header and/or the payload of the packet received by DUT 130. DPI is a type of computer network packet filtering that examines the data part and also the header of a packet as it passes an inspection point (e.g., DUT 130) searching for protocol non-compliance, viruses, spam, intrusions, or defined criteria to decide whether the packet may pass or if it needs to be routed to a different destination, or, for the purpose of collecting statistical information at the Application layer of the Open Systems Interconnection model (OSI). For example, a firewall running on DUT 130 can perform the DPI on the data packets as they pass between client machine 110 and server machine 120. Other aspects of the firewall can also be tested using test system 100.

Both client machine 110 and server machine 120 can include hardware and software that implement features described herein. Client machine 110 and server machine 120 may include one or more of logic arrays, memories, analog circuits, digital circuits, software, firmware and processors such as microprocessors, field programmable gate arrays (FPGAs), application-specific integrated circuits (ASICs), programmable logic devices (PLDs) and programmable logic arrays (PLAs). The hardware may be found in the chassis, card rack or integrated unit. It may include a specifically programmed and/or customized general purpose computer that is capable of communicating with DUT 130. Both client machine 110 and server machine 120 may include a number of separate units that are clustered together or remote from one another.

Specifically, in an implementation, each of client machine 110 and server machine 120 can include a processor with at least four cores and could each include two processors, each having 16 cores. An implementation of client machine 110 and server machine 120 can also include 512 GB of Random Access Memory (RAM) or more.

The client machine 110 can reasonably emulate about 5 million clients, each having multiple HTTPS connections. In an implementation, it would not be unreasonable to emulate up to 10 million HTTPS client connections at a given time. These "clients" are emulated using finite state machines (FSMs), which are described in more detail below. In FIG. 1, client machine 110 is executing client state machine 111, client state machine 112, client state machine 113 and client state machine 114. This is only an example and many more state machines can be executed. Each client state machine, as executed can represent an emulated client.

The server machine 120 can reasonably emulate about 5 servers, for example, but should be capable of emulating hundreds of thousands of servers. Typically, the emulation of 5 servers is sufficient to establish HTTPS sessions (e.g., or other type of network traffic) with one million or more clients. Just like the "clients," the "servers" are emulated using a FSM. In FIG. 1, the example server machine 120 is emulating server state machine 121, server state machine 122, server state machine 123 and server state machine 124.

The calibration and analysis tool 140 can be a standard desktop computer, a laptop computer, any other type of portable computing device that is capable of connecting to at least one of client machine 110, server machine 120 and DUT 130. Calibration and analysis tool 140 may also be a customized computing device running customized software. The calibration and analysis tool 140 can be capable of configuring client machine 110, server machine 120 and/or DUT 130 and can monitor the DPI being performed by DUT 130 (or performed by other devices or software) while the data packets are being transmitted between client machine 110 and server machine 120.

The results of the test (e.g., a stress test) being conducted on DUT 130 can be collected by or delivered to calibration and analysis tool 140, as well as client machine 110 and server machine 120. Some or all of the functionality of calibration and analysis tool 140 can be performed by client machine 110 and/or server machine 120.

While FIG. 1 merely illustrates three connections to DUT 130, it is possible to connect client machine 110 to many ports or interfaces of DUT 130 as well as connect server machine 120 to many ports or interfaces of DUT 130. DUT 130, for example, have a separate port or ports that handle ingress and a separate port or ports that handle egress, or there can be a set of ports that handle both ingress and egress. The same is also possible for calibration and analysis tool 140. Examples of port or interface types include IP, Multiprotocol label switching (MPLS) and Ethernet interfaces. Examples of interface configurations include IPv4, IPv6, MPLS, Ethernet, virtual local-area network (VLAN), generic routing encapsulation (GRE), backbone service instance tag (I-TAG), layer two tunneling protocol (L2TP) (v2/3), point-to-point protocol (PPP), point-to-point protocol over X (PPPoX), worldwide interoperability for microwave access (WiMax), high-level data link control (HDLC), ATM adaption layer 5 (AAL5), point of sale (POS), internet protocol security (IpSec), media access security (MacSec) (802.1ae, 802.1af), and Fiber Channel. These interface types and interface configurations can be setup and/or determined using interface configuration information that is available from test system 100 and/or DUT 130.

The interface configuration information depends on the interface type. For IPv4 or IPv6, the interface configuration includes a static or dynamic IP address of the emulated device and a static or dynamic gateway IP address. For the MPLS interface, the interface configuration includes at least one MPLS label. For a PPPoE or PPPoEoA interface (collectively allows with related variants, "PPoX"), the interface configuration includes at least a session ID. For the Ethernet interface, the interface configuration includes at least a MAC address. Some of this interface configuration information is supplied dynamically using a setup protocol. For IPv4 or IPv6 configuration, the set up protocol for a dynamic IP address may be DHCP or PPP. For the MPLS configuration, the setup protocol for an MPLS label may be LDP. For other interfaces, which have interface address configurations that are dynamically learned using interface set up protocols, the method exercises, as appropriate to the interface, one or more of PPPoX, L2TP, WiMax, IpSec, MacSec, or Fiber Channel. According to a further aspect of the method, the device configuration received for the test device and the DUT to set up network connectivity may be one or more industry standard routing or switching protocols known as STP (and its variants), OSPF, RIP, BGP, LDP, BFD, EOAM, IS-IS, LACP, PIM, RSVP.

Essentially, test system 100 is configurable on many levels and is capable of interfacing with a DUT 130 using any of the interfaces and protocols from the OSI layers (i.e. layers 1-5) that are below the HTTPS layers (i.e., layers 6 and 7).

Once client machine 110, server machine 120, DUT 130 and calibration and analysis tool 140 have been set up to run the "stress test," it will be necessary to start establishing HTTPS sessions (e.g., or other type of network traffic) between the various emulated clients and the various emulated servers. Ideally, the "stress test" will be run in a laboratory type environment. However, the "stress test" could also be performed in the field for the purpose of determining whether a DUT deployed in the field has been damaged and needs replacement or repair.

Figure 2A:
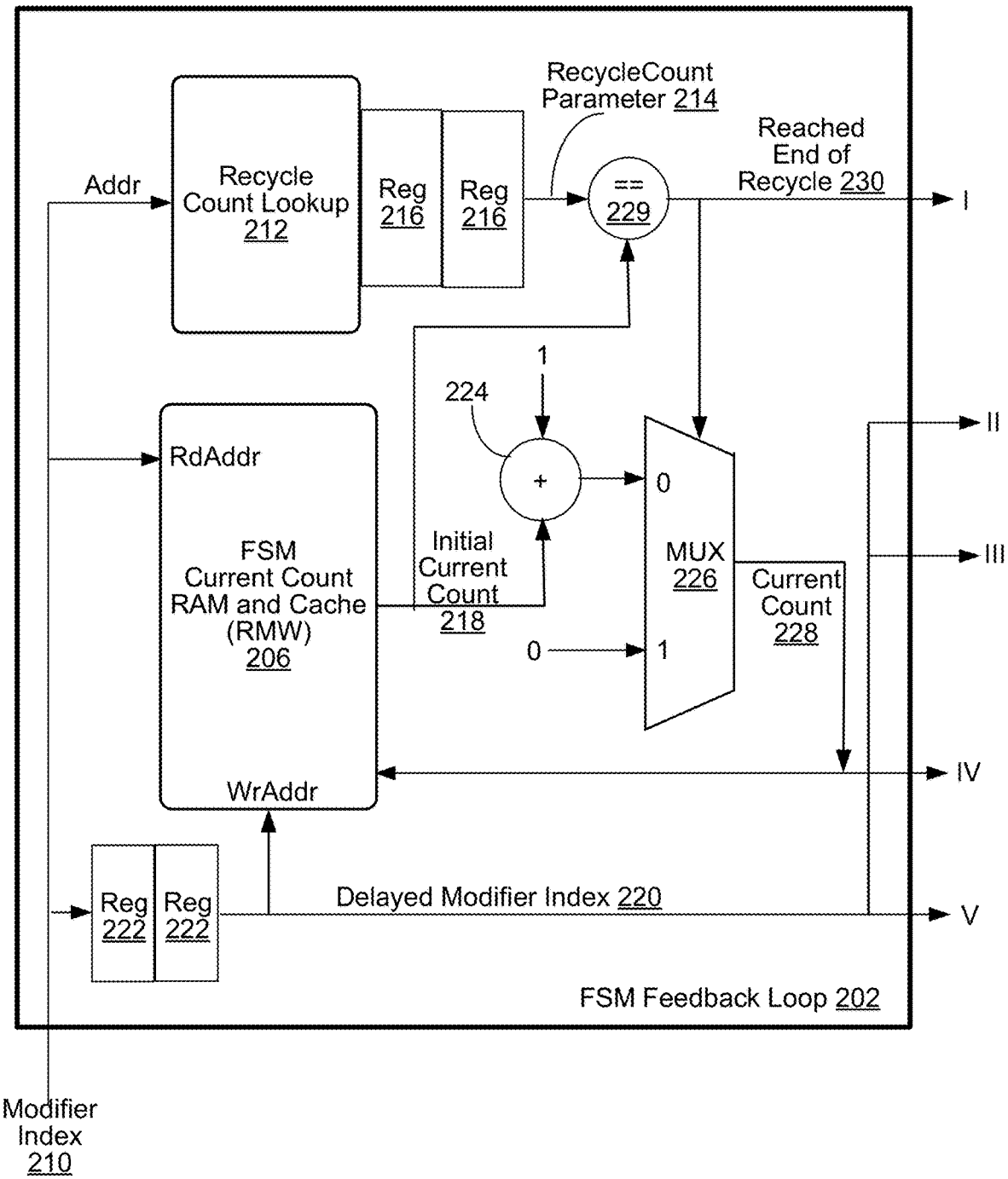
FIG. 2A illustrates a multiple range variable field modifier process that includes a finite state machine feedback loop, according to an embodiment of the technology disclosed.
Figure 2B:
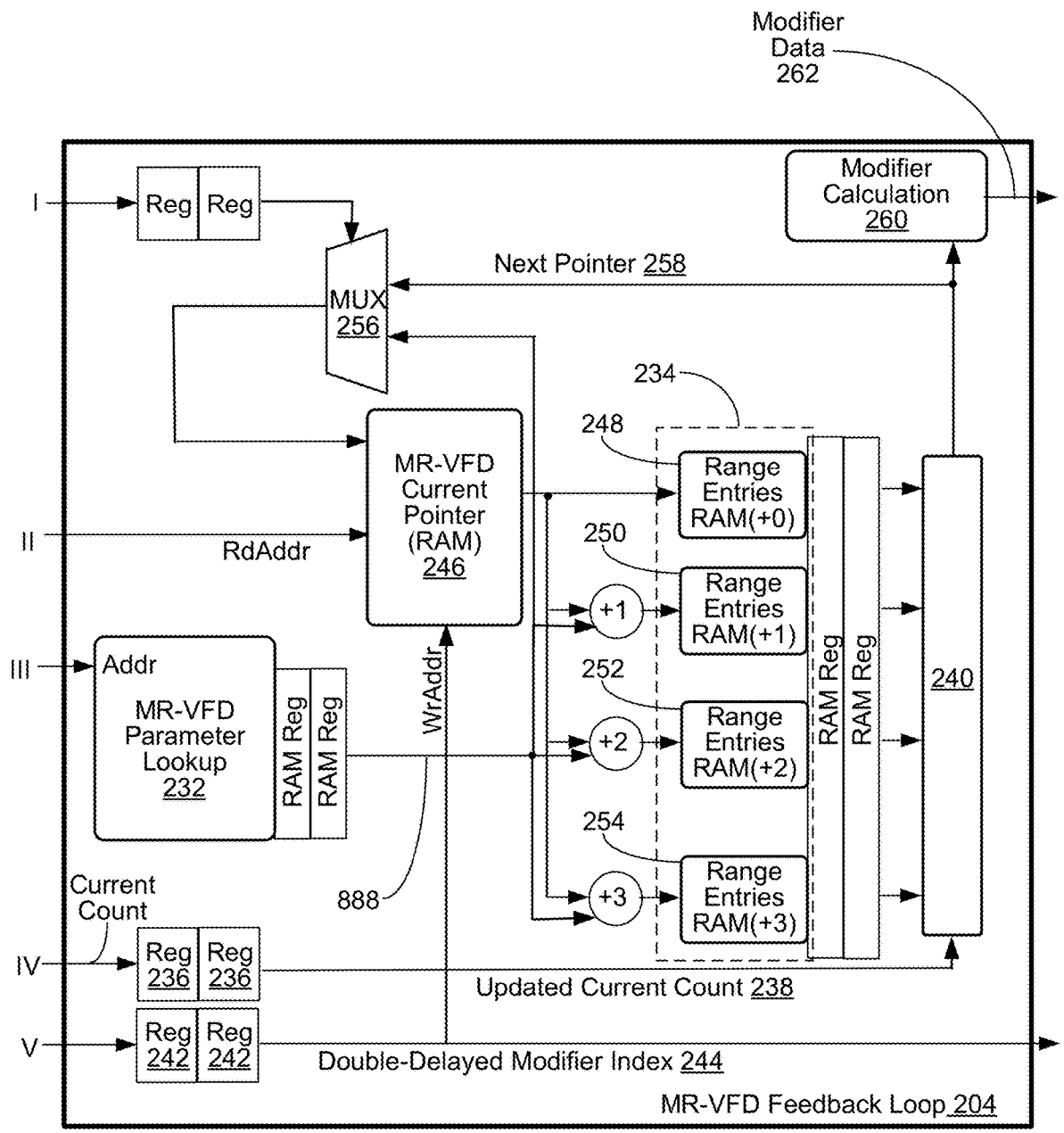
FIG. 2B illustrates a multiple range variable field modifier process which includes a multi-range variable field feedback loop, according to an embodiment of the technology disclosed.

FIG. 2A illustrates a multiple range variable field modifier process that involves a finite state machine (FSM) feedback loop 202. FIG. 2B illustrates a multiple range variable field modifier process that involves an MR-VFD feedback loop 204 (also referred to as a range variable field modifier feedback loop), according to embodiments of the technology disclosed. FSM feedback loop 202 and MR-VFD feedback loop 204 are connected to each other via connections identified in the figures by Roman numerals I, II, III, IV, and V.

FSM feedback loop 202 may continuously increment a counter value by one for each clock cycle, corresponding to one data packet, until the counter value reaches a threshold value, called the recycle count value. In some implementations, the recycle count value may be set according to values or sizes of address ranges stored in a memory and identified according to received modifier index instructions, such that the counter resets to 0, or other initial value) when the counter value reaches the recycle count value. The steps continuously carried out in FSM feedback loop 202 are described below.

FSM feedback loop 202 includes an FSM 206 that receives a new modifier index 210 at each clock cycle (e.g., at each packet time). Note that memory described herein as ROM need not be hardware ROM. Instead, "ROM" may refer to Random Access Memory (RAM) that may be pre-programmed with initial values. However, with respect to feedback loop functionality, these RAM appear as read-only memory in that values are not written to this memory on the fly. The modifier index is an address, which is assigned to each data packet by software, for example, that manages the generation of test packets.

Modifier index 210 may be used by FSM 206 to look up information such as start and stop range pointers, mode, and recycle count value, just to name a few examples.

With each clock cycle, in addition to being received by FSM 206, a new modifier index 210 can also be received by a RecycleCount Lookup memory block 212, which in turn generates a RecycleCount parameter 214. There can be a delay placed on the output of RecycleCount Lookup memory block 212 by one or more registers, such as 216, for example. The value of the RecycleCount parameter can be obtained from a lookup table on an FSM parameter memory using the received modifier index as the address of the location within the table. For example, if the modifier index is 10 bits, a 1024 deep RAM (e.g., 2 raised to the exponent 10) can be accessed at the address that is described in the index.

In some implementations, FSM 206 receives modifier index 210 at every clock cycle for, among other reasons, caching. In this way, FSM 206, which includes a current count RAM, can include information ahead of time about which modifier index will be read (after being pipelined) so that FSM 206 can do a lookup (which takes two clocks to come out, similar to other RAMs). A cache circuit in FSM 206 can, after these two clock cycles, use a MUX (multiplexer circuit) to potentially select what is in the cache instead of what is in the current count RAM, depending if a previous packet with the same modifier index has come within two cycles before it.

Modifier index 210 can be pipelined (e.g., using a set of data processing elements connected in series, where the output of one element is the input of the next one) so that it aligns with RecycleCount parameter 214. This pipelining can be performed using, as mentioned above, two serially arranged registers to provide a delayed version of a new modifier index to FSM 206, such that the delayed version of the new modifier index aligns timewise with the identified value of RecycleCount parameter 214 that is output from RecycleCount Lookup memory block 212.

Next, an initial current count value 218 can be output from FSM 206 based on a delayed modifier index 220, which is modifier index 210 delayed by registers 222, for example. The read initial current count value is then incremented by a value of 1, as indicated by element 224, and the incremented initial current count value is provided to a first selector 226, which may be a MUX, as a current count 228. Current count value 228 allows the FSM feedback loop to establish a state of the circuit within a range of current count values. For example, if a particular modifier index (modifier index 1) corresponds to a RecycleCount parameter of 9, then each time the particular modifier index clocks in, initial current count value 218 for the particular modifier index is incremented, resulting in the cycle: 0, 1, 2, 3, 4, 5, 6, 7, 8, 9, 0, 1, 2, 3, 4, 5, 6, 7, 8, 9 . . . . As another example, if another modifier index (modifier index 2) corresponds to a RecycleCount parameter of 4, then each time this modifier index clocks in, initial current count value 218 is incremented as follows: 0, 1, 2, 3, 4, 0, 1, 2, 3, 4, . . .

If initial current count value 218 equals the value of RecycleCount parameter 214, as determined by an element 229, then a ReachedEndofCycle parameter 230 is set equal to 1 (as opposed to 0). This process may be performed by comparing current count value 228 to the identified value of RecycleCount parameter 214, setting a value of a ReachedEndofCycle parameter to 0 when the value of the RecycleCount parameter does not equal the current count value and setting a value of the ReachedEndofCycle parameter to 1 when the value of the RecycleCount parameter equals the current count value. Further, first selector 226 may be used to output the incremented initial current count value when the value of the ReachedEndofCycle parameter is 0 and to output a value of 0 when the value of the ReachedEndofCycle parameter is 1. The output of the first selector is written to (e.g., via feedback) FSM 206. This loop/cycle (FSM feedback loop) continuously runs to provide various values, such as delayed modifier index 220, ReachedEndofCycle parameter 230, and current count 228 to the subsequent loop/cycle of MR-VFD feedback loop 204. Numerals I, II, III, IV, and V indicate circuit connections between FSM Feedback Loop 202 and MR-VFD feedback loop 204 of FIGS. 2A and 2B, respectively.

MR-VFD feedback loop 204 includes elements that continuously identify sets of address ranges for generating data packets for network stress testing so that more than one set of address ranges can be identified per clock cycle. The sets of address ranges may be continuously identified by using clock cycle-delayed modifier index instructions that identify a particular range table that includes multiple address range entries (e.g., comprising start and end values for the address range entries). Each identified address range may be stored in a dedicated memory (for relatively fast retrieval/output). The current address range may be an output identified by using a current-range pointer that is continuously updated. The current-range pointer maybe reset to 0 (e.g., or other initial value for a starting range value) two clock cycles after the continuous incrementing of the counter results in the current-range pointer reaching the recycle count threshold. MR-VFD feedback loop 204 includes an MR-VFD parameter lookup memory 232 that receives the delayed version of a new modifier index 220 (via circuit connection III). MR-VFD feedback loop 204 also includes an MR-VFD Range Entries RAM 234 that is temporarily assigned a parameter corresponding to each received (new) modifier index. Such a parameter may be from a table called a MultiRangeTable, which includes a list of ranges. Start and end parameters indicate where a particular MultiRangeTable, for a particular modifier index, resides in a memory space of MR-VFD parameter lookup memory 232.

A process in MR-VFD feedback loop 204 includes obtaining, from MR-VFD parameter lookup memory 232 and using the delayed version of the new modifier index 220, MR-VFD parameters including a StartRangeTable value and an EndRangeTable value. The StartRangeTable value points to a first entry of a MultiRangeTable that corresponds to the received modifier index. The EndRangeTable value points to a last entry of the MultiRangeTable that corresponds to the received modifier index. The delayed version of the new modifier index is received at MR-VFD parameter lookup memory 232 so that the StartRangeTable value and the EndRangeTable value are aligned with FSM feedback loop 202 to properly obtain current count value 228.

MR-VFD feedback loop 204 also involves a process of pipelining the output of selector 226 (via connector IV) through two serially arranged registers 236 to provide, as an updated current count 238, a delayed version of the output of selector 226. Further, MR-VFD feedback loop 204 includes a Next Pointer Calculator 240 (e.g., a MUX) that receives, at each clock cycle, updated current count 238. Via connector V, delayed modifier index 220 may be pipelined through two serially arranged registers 242 to provide, as a double-delayed modifier index 244, a delayed version of the delayed modifier index. The double-delayed modifier index 244 may then be received at an MR-VFD current pointer RAM 246. A CurrentRangePointer value is obtained from MR-VFD current pointer RAM 246 based on the double-delayed modifier index 244 received at the MR-VFD current pointer RAM.

As mentioned above, MR-VFD Range Entries RAM 234 is temporarily assigned a parameter corresponding to each received (new) modifier index, such as double-delayed modifier index 244. The parameter may be from a MultiRangeTable, for example. MR-VFD Range Entries RAM 234 may comprise, as in the presently described embodiment, a first range RAM 248, a second range RAM 250, a third range RAM 252 and a fourth range RAM 254.

At first range RAM 248, a first range entry/value is read from a location corresponding to the obtained CurrentRangePointer value obtained from MR-VFD current pointer RAM 246 and based on the double-delayed modifier index 244 received at the MR-VFD current pointer RAM. An offset value and a MaxValue can be determined based on the read first range/entry value. For example, if the read range/value has a range of 2 to 5, then the range/entry value has 4 spots/numbers (e.g., 0, 1, 2, 3). The offset is determined using the current count and the value of the range. The current count is subtracted from the range. For example, since this is the first range, at a current count of 0, the range/entry value is 2 and the offset is 2 (range value of 2 minus current count of 0 equals 2). Similarly for range/entry value of 3, the offset is 2 (range value of 3 minus current count of 1 equals 2). Continuing on, for range/entry value of 4, the offset is 2 (range value of 4 minus current count of 2 equals 2). Finally, for range/entry value of 5, the offset is 2 (range value of 5 minus current count of 3 equals 2). Accordingly, the offset remains the same value for the entire first range of 2 to 5. The MaxValue is defined as the maximum value of the counter while the circuit is using the particular range (e.g., the first range). Since the current count starts at 0, the MaxValue is 3 (accounting for the four numbers in the first range of 2 to 5). Another way to calculate the MaxValue for a range is to count the amount of numbers in the range (i.e., four numbers are in the range of 2 to 5) and then subtract 1. Here, the MaxValue of 3 is associated with the entire range of 2 to 5 and the offset of 2 is associated with the entire range of 2 to 5. In other words, the MaxValue for a particular range is the highest current count for that range before a subsequent range is used. Once the current count is higher than the MaxValue for the range 2 to 5, in this example, the process moves on to the second range entry/value from the second range RAM, and so on until all of the ranges of the range RAMs (e.g., 248, 250, 252, 254) are utilized.

Note that the range value of 2 to 5 is a simplification of a more complex range. For example, the technology disclosed includes embodiments to generate a MAC or IP address, and ranges may be 1.1.1.2, 1.1.1.3, 1.1.1.4, and 1.1.1.5, just to provide some particular numeric examples. Herein, while a simplified version of ranges is used, the simplified version may actually be referring to a range of MAC or IP addresses, for example.

At second range RAM 250, if the CurrentRangePointer value minus the

EndRangeTable value equals 0, then a second range entry/value is read from a location corresponding to the StartRangeTable value. If the CurrentRangePointer value minus the EndRangeTable value does not equal 0, then the second range entry/value is read from a location corresponding to the CurrentRangePointer value plus 1. Similar to the first range, an offset value and a MaxValue can be determined from the second range. For example, if the read second range has a range of 8 to 10, the range has 3 numbers/spots. Since this is the second range, which occurs after the first range, then this range will begin at a current count of 4. As a result, the offset for this second range will be the first value in this range (8) minus the current count (4) to equal 4. The MaxValue can be calculated by determining the maximum current count for that particular range, which is 6. Another way to calculate the MaxValue for the second range is to add the amount of numbers/spots in the first range (4) to the amount of numbers/spots in the second range (3) and then subtract 1 to account for the fact that the current count starts at 0. Accordingly, the MaxValue for this example second range of 8 to 10 is 6, which is the highest current count at which this second range is complete.

At third range RAM 252, if the CurrentRangePointer value minus the

EndRangeTable value equals 0, then a third range entry/value is read from a location corresponding to the StartRangeTable value plus 1. If the CurrentRangePointer value minus the EndRangeTable value equals 1, then the third range entry/value is read from a location corresponding to the StartRangeTable value. If the CurrentRangePointer value minus the EndRangeTable value does not equal 0 and does not equal 1, then the third range entry/value is read from a location corresponding to the CurrentRangePointer value plus 2.

If the read third range has a range of 15 to 16, the range has two numbers/spots.

Since this is the third range, which occurs after the second range, then this range will begin at a current count of 7. As a result, the offset for this third range will be the first value in this range (15) minus the current count (7) to equal 8. The MaxValue can be calculated by determining the maximum current count for that particular range, which is 8. Another way to calculate the MaxValue for the third range is to add the amount of numbers/spots in the first and second ranges (4+3) to the amount of numbers/spots in the third range (2) and then subtract 1 to account for the fact that the current count starts at 0.

Accordingly, the MaxValue for this example third range of 15 to 16 is 8, which is the highest current count at which this third range is complete.

At fourth range RAM 254, if the CurrentRangePointer value minus the

EndRangeTable value equals 0, then a fourth entry/value is read from a location corresponding to the StartRangeTable value plus 2. If the CurrentRangePointer value minus the EndRangeTable value equals 1, then the fourth entry/value is read from a location corresponding to the StartRangeTable value plus 1. If the CurrentRangePointer value minus the EndRangeTable value equals 2, then the fourth entry/value is read from a location corresponding to the StartRangeTable value. If the CurrentRangePointer value minus the EndRangeTable value does not equal 0, does not equal 1, and does not equal 2, then the fourth entry/value is read from a location corresponding to the CurrentRangePointer value plus 3.

Continuing with the range examples above, if the read fourth range is a range of 20 (note that a range can include just a single number), the range has one number/spot. Since this is the fourth range, which occurs after the third range, then this range will begin at a current count of 9. As a result, the offset for this fourth range will be the first value in this range (20) minus the current count (9) to equal 11. The MaxValue can be calculated by determining the maximum current count for that particular range, which is 9. Another way to calculate the MaxValue for the fourth range is to add the amount of numbers/spots in the first, second and third ranges (4+3+2) to the amount of numbers/spots in the fourth range (1) and then subtract 1 to account for the fact that the current count starts at 0. Accordingly, the MaxValue for this example fourth range of 20 is 9, which is the highest current count at which this fourth range is complete.

In these examples, four range RAMs, 248, 250, 252, and 254, are used to implement four ranges. The technology disclosed can use more or less range RAMs. The range values read from the range RAMs may be used to identify a MAC or IP address to which a data packet is to be sent. This technique of looking ahead (establishing various ranges ahead of the current clock) allows the MAC or IP addresses to be identified and sent out at every clock cycle without delay.

MR-VFD feedback loop 204 also involves a process, at Next Pointer Calculator 240, which receives updated (delayed) current count 238, of comparing the updated current count to each of the first, second, third, and fourth range entries/values, determining to which of the first, second, third, and fourth range values/entries the updated current count belongs, and updating the CurrentRangePointer value to point to an expected correct entry of the range that corresponds to a next clock cycle. This can be accomplished by comparing updated current count 238 to the MaxValue for each of the ranges, to determine which range the updated current count falls into. If the updated current count equals one of the MaxValues, then it is expected that for the next clock cycle a subsequent range will be used. Using the examples from above, if the updated current count equals the MaxValue of 3 for the first range, then for the next clock cycle the second range should be used because the last number of the first range is reached. Therefore, the CurrentRangePointer value is changed so as to point to the second range, and so on.

Further, MR-VFD feedback loop 204 involves, at a selector 256 (e.g., a MUX), a process of receiving a pipeline-delayed version of the ReachedEndofCycle parameter, outputting the updated CurrentRangePointer value to MR-VFD current pointer RAM 246 when the value of the pipeline-delayed version of the ReachedEndofCycle parameter is 0, and outputting a Next Pointer value 258 to MR-VFD current pointer RAM 246 when the value of the pipeline delayed version of the ReachedEndofCycle parameter is 1. This process may set the CurrentRangePointer value in MR-VFD current pointer RAM 246 to be equal to Next Pointer value 258 output by selector 256. Next Pointer value 258 is also provided to a Modifier Calculation block 260, which is described in detail below (e.g., FIG. 9)

Additionally, MR-VFD feedback loop 204 involves generating an output, which may include a mode, the updated current count 238, the current offset, and the value of the range. Some or all of the output may be inserted into an encapsulation of a packet that is used to stress test a highspeed network and network components. The mode is a variable that identifies a mode of operation. The examples provided above refer to a mode where the range values are incremented within the range. This mode can be referred to as an increment mode. There may be other modes such as decrement, replace and passthrough, and so on.

For an example of the increment mode, the example range values described above may be used. An example value of 11 can be used to indicate the increment mode. A list of elements of Range1 (2 to 5) are 1.1.1.2, 1.1.1.3, 1.1.1.4, and 1.1.1.5, having the offset of 2, which is actually 1.1.1.2. A list of elements of Range2 (8 to 10) are 2.2.2.8, 2.2.2.9, and 2.2.2.10, having an offset of 2.2.2.4. A list of elements of Range3 (15 to 16) are 3.3.3.15 and 3.3.3.16, having an offset of 3.3.3.8. The element of Range4 (20) is 4.4.4.20, having an offset of 4.4.4.11. With these ranges, example outputs can be as follows for all 4 ranges:

Output1: (i) current count is 0, (ii) range1 value of 1.1.1.2 (offset of 1.1.1.2+current count of 0), (iii) mode value of 11, and (iv) offset value of 2.

Output2: (i) current count is 1, (ii) range1 value of 1.1.1.3 (offset of 1.1.1.2+current count of 1); (iii) mode value of 11, and (iv) offset value of 2.

Output3: (i) current count is 2, (ii) range1 value of 1.1.1.4 (offset of 1.1.1.2+current count of 2); (iii) mode value of 11, and (iv) offset value of 2.

Output4: (i) current count is 3, (ii) range1 value of 1.1.1.5 (offset of 1.1.1.2+current count of 3); (iii) mode value of 11, and (iv) offset value of 2.

Output5: (i) current count is 4 (which is above MaxValue of range1, so the process proceeds to range2), (ii) range2 value of 2.2.2.8 (offset of 2.2.2.4+current count of 4); (iii) mode value of 11, and (iv) offset value of 4.

Output6: (i) current count is 5 (which is above MaxValue of range1, so the process proceeds to range2], (ii) range2 value of 2.2.2.9 (offset of 2.2.2.4+current count of 5); (iii) mode value of 11, and (iv) offset value of 4.

Output7: (i) current count is 6 (which is above MaxValue of range1, so the process proceeds to range2], (ii) range2 value of 2.2.2.10 (offset of 2.2.2.4+current count of 6); (iii) mode value of 11, and (iv) offset value of 4.

Output8: (i) current count is 7 (which is above MaxValue of range2, so the process proceeds to range3], (ii) range3 value of 3.3.3.15 (offset of 3.3.3.8+current count of 7); (iii) mode value of 11, and (iv) offset value of 8.

Output9: (i) current count is 8 (which is above MaxValue of range2, so the process proceeds to range3], (ii) range3 value of 3.3.3.16 (offset of 3.3.3.8+current count of 8); (iii) mode value of 11, and (iv) offset value of 8.

Output10: (i) current count is 9 (which is above MaxValue of range3, so the process proceeds to range4], (ii) range4 value of 4.4.4.20 (offset of 4.4.4.11+current count of 9); (iii) mode value of 11, and (iv) offset value of 11.

For an example of the decrement mode, range values that are similar to those described above may be used. When decrementing, the ranges can be reversed or the process can start with the last number of the range. A value of 10 can be used to indicate the decrement mode. A list of elements of Rangel (5 to 2) are 1.1.1.5, 1.1.1.4, 1.1.1.3, and 1.1.1.2, having an offset of 5 (1.1.1.5). A list of elements of Range2 (10 to 8) are 2.2.2.10, 2.2.2.9, and 2.2.2.8, having an offset of 2.2.2.6. A list of elements of Range3 (16 to 15) are 3.3.3.16, 3.3.3.15, and 3.3.3.17, having an offset of 3.3.3.9. An element of Range4 (20) is 4.4.4.20, having an offset of 4.4.4.11. The outputs are calculated the same as that described above for the increment mode, except the current count is subtracted from the range value. For example, for output2: (i) current count is 1, (ii) range1 value of 1.1.1.4 (offset of 1.1.1.5 - current count of 1), (iii) mode value of 10, and (iv) offset value of 5.

The replace mode can be identified using a value of 01, for example. In the replace mode the same value is used for each iteration. There is no range per se. For instance, using the example from above with respect to the increment mode, the first four outputs would indicate 1.1.1.2. Once the MaxValue is reached at output 4, outputs 5 through 7 would indicate 2.2.2.8.

The passthrough mode can be identified using a value of 00, for example. The passthrough mode does not use MR-VFD feedback loop 204. The current count is used to set the output (e.g., if current count is 3, then 1.1.1.4 is used as the IP address).

In some embodiments, MR-VFD Parameter Lookup memory 232 is accessed using delayed modifier index 220, which includes information to (i) identify the StartRangeTable, (ii) identify the EndRangeTable, and (iii) identify the mode.

For added simplicity, MR-VFD Parameter Lookup memory 232, per delayed modifier index 220, should have enough entries to do as many lookaheads as required for the feedback loop. For this example of 4 lookaheads (using first through fourth range RAMs), if there are only 2 or 3 entries required in the table, then the number of entries will be doubled up to 4 or 6 in MR-VFD Parameter Lookup memory 232. This may ensure that the RecycleCount parameter 214 of RecycleCount Lookup memory 212 of the first feedback loop is adjusted to be doubled as well. Accordingly, the number of ranges stored in a range table needs to be greater than the number of "lookaheads."

For an example, RecycleCount parameter 214 can be 14 bits and may be the sum of all ranges in the entire list of ranges in the RecycleCount Lookup memory. For instance, if there are 3 ranges set up, such as 1 to 4, 7 to 8, and 13 to 21, these total to 4+2+9=15, giving a recycle count of 14, which can be updated during setup, in some implementations. If the ranges in the RecycleCount Lookup memory are updated, then the RecycleCount parameter in the RecycleCount Lookup memory is reprogrammed to match.

Figure 3:
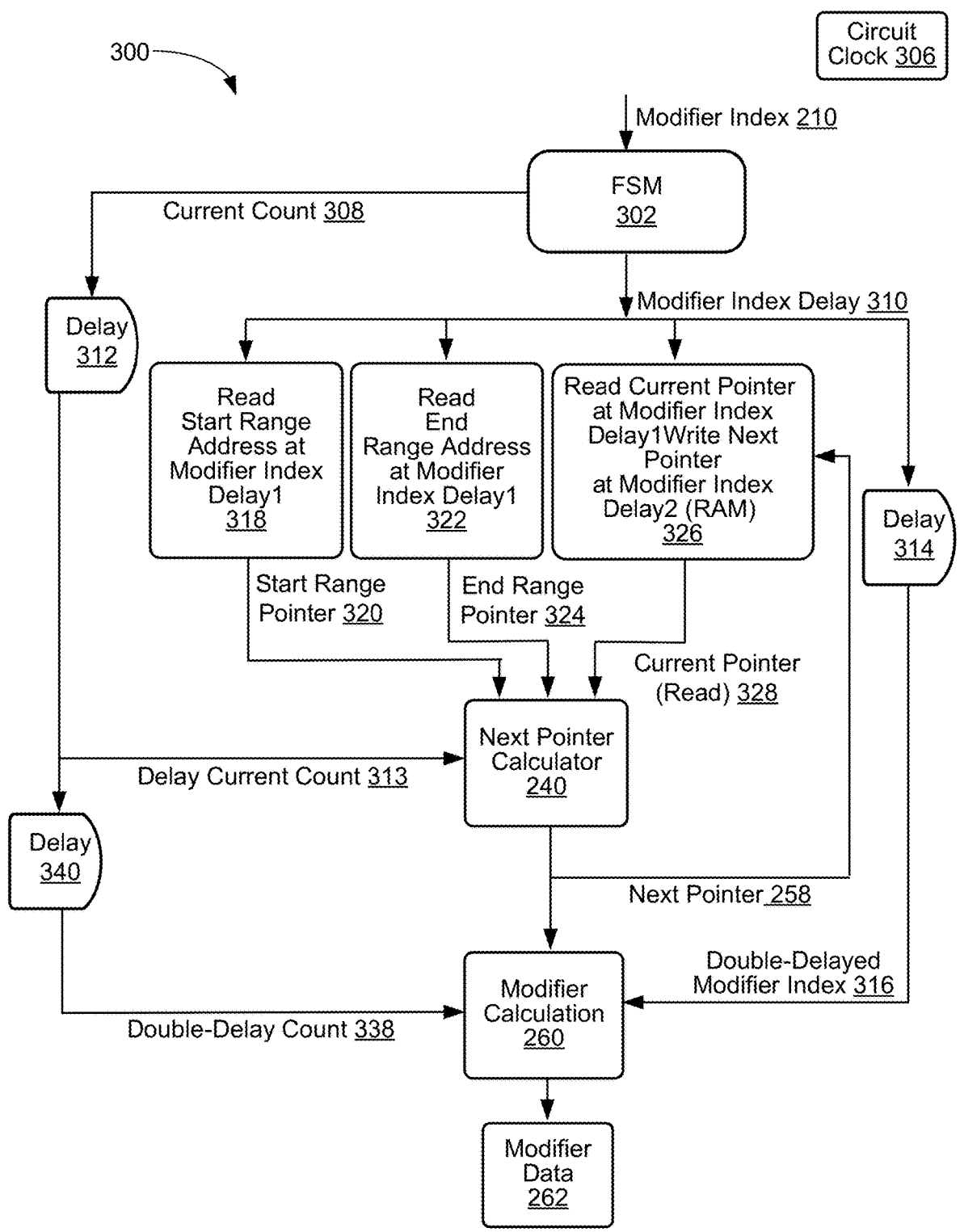
FIG. 3 illustrates some details of the multi-range variable field feedback loop, according to an embodiment of the technology disclosed.

FIG. 3 illustrates embodiments of a circuit 300 used for multiple range variable field modifier processes, as described above. Circuit 300 comprises elements that perform the same or similar functions as those in FSM feedback loop 202 and MR-VFD feedback loop 204. Circuit 300 includes a finite state machine (FSM) 302, which may be similar to or the same as FSM 206 in FIG. 2A. FSM 302 may receive modifier index 210, which may be clocked in at each cycle of a circuit clock 306. FSM 302 subsequently produces a current count 308 and a modifier index delay signal 310. A delay element 312 may delay current count 308 by any of a number of techniques, such as by one or more data registers in series, to produce a delay current count 313. Similarly, a delay element 314 may delay modifier index delay signal 310 to produce a double-delayed modifier index 316. Delay element 314 may be similar to or the same as registers 242 of FIG. 2B.

Modifier index delay signal 310 may be applied to a block 318, where a start pointer of an address range, based on the value of modifier index delay signal 310, may be read (e.g., from a RAM functioning as a ROM on the fly). Block 318 resultantly produces a start range pointer signal 320. The start range pointer signal may be 14 bits, for example, and can be used to point to the first entry of a range table for a particular modifier index. Modifier index delay signal 310 may also be applied to a block 322, where an end pointer of an address range, based on the value of modifier index delay signal 310, may be read (e.g., from a RAM functioning as a ROM on the fly). Block 322 resultantly produces an end range pointer signal 324. The end range pointer signal may be 14 bits, for example, and can be used to point to the last entry of the range table for a particular modifier index. Finally, modifier index delay signal 310 may also be applied to a block 326, where a current pointer, based on the value of modifier index delay signal 310, may be read (e.g., from a random access memory (RAM) of block 326). Block 326 may also write a next pointer, based on the value of double-delayed modifier index signal 316 (and based on a "next pointer signal" as described below), to the RAM. Block 326 resultantly outputs, among other things, the current pointer as a current pointer signal 328. The current pointer signal may be 14 bits, for example. The current pointer signal may be used to point to a particular range entry in the range table that is currently active (e.g., a currently active multi range table) for a particular modifier index.

Start range pointer signal 320, end range pointer signal 324, and current pointer signal 328 may all be applied to Next Pointer Calculator 240, which may also receive delay current count 313 resulting from current count 308 that is delayed by delay block 312, as described above. Next Pointer Calculator 240 produces next pointer value 258, which may be fed back into block 326, which may be written to the RAM of block 326. Next Pointer Calculator 240 may also apply next pointer value 258 to Modifier Calculation block 260, which may also receive a double-delayed count 338 (e.g., delayed further from delay current count 313 by a delay element 340) and double-delayed modifier index 316. Resultantly, Modifier Calculation block 260 may produce, as described in detail below, modifier data 262 to be applied to data packets that will be used in a device under test.

Figure 4:
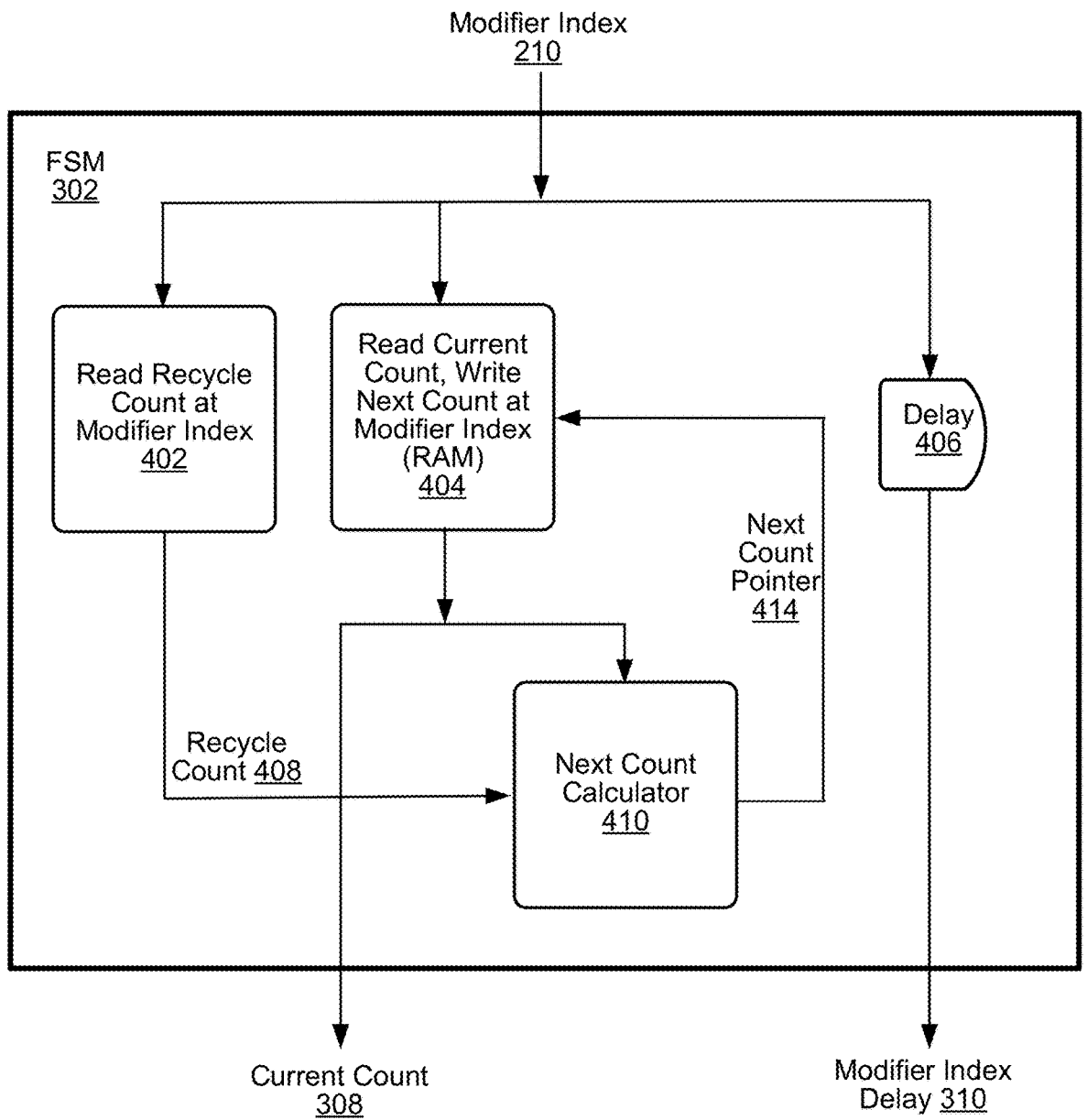
FIG. 4 illustrates a finite state machine, according to an embodiment of the technology disclosed.

FIG. 4 illustrates some details of FSM 302, according to an embodiment of the technology disclosed. FSM 302 includes a block 402, a block 404, and a delay element 406, each configured to receive modifier index 210. In particular, block 402 may be configured to read from a memory (e.g., a RAM functioning as a ROM on the fly) a recycle count based on modifier index 210. Block 404 may be configured to read a current count from a RAM and write a next count (based on a next count pointer signal, as described below) to the RAM based on modifier index 210. Delay element 406 may comprise one or more registers.

Block 402 may provide a recycle count 408 to a Next-Count Calculator 410, which may also receive current count 308 that is output from block 404. Next-Count Calculator 410 may subsequently generate a next count signal 414 based, at least in part, on current count 308. Next-Count Calculator 410 may in turn provide next count signal 414 to block 404. Recall that current count 308 is output from FSM 302 in FIG. 3. Additionally, FSM 302 outputs modifier index delay signal 310.

Figure 5:
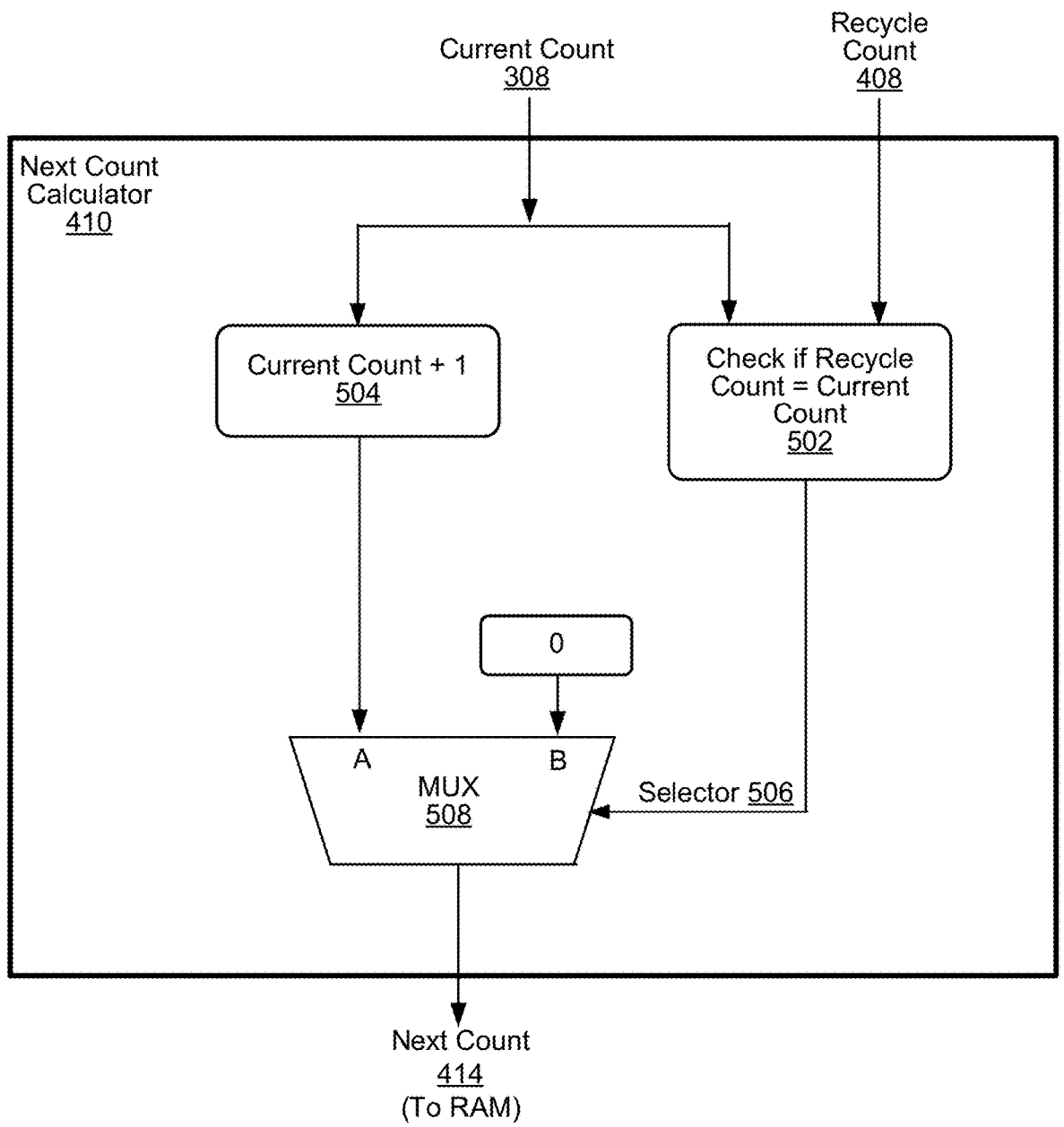
FIG. 5. Illustrates a next count calculator, according to an embodiment of the technology disclosed.

FIG. 5. illustrates some details of Next-Count Calculator 410, according to an embodiment of the technology disclosed. As described above, Next-Count Calculator 410 may receive recycle count 408 and current count 308, both being provided to a selector block 502. An increment block 504 receives current count 308. Selector block 502 determines if recycle count 408 is equal to current count 308 and produces a selector signal 506 based on the determination. Increment block 504 increments current count 308 by one and provides this result to an input A of a two-input MUX 508. A value of zero (or another number that may be established as an initial value) is applied to an input B of the MUX. Next count signal 414 is output from MUX 508 based on selector signal 506. In other words, selector signal 506 selects the input at A or at B as the output of MUX 508. If recycle count 408 is equal to current count 308, then selector block 502 produces selector signal 506 such that input B, which is zero (or another initial value), is presented at the MUX output. If recycle count 408 is not equal to current count 308, then selector block 502 produces selector signal 506 such that input A, which is the incremented current count, is presented at the MUX output.

Figure 6:
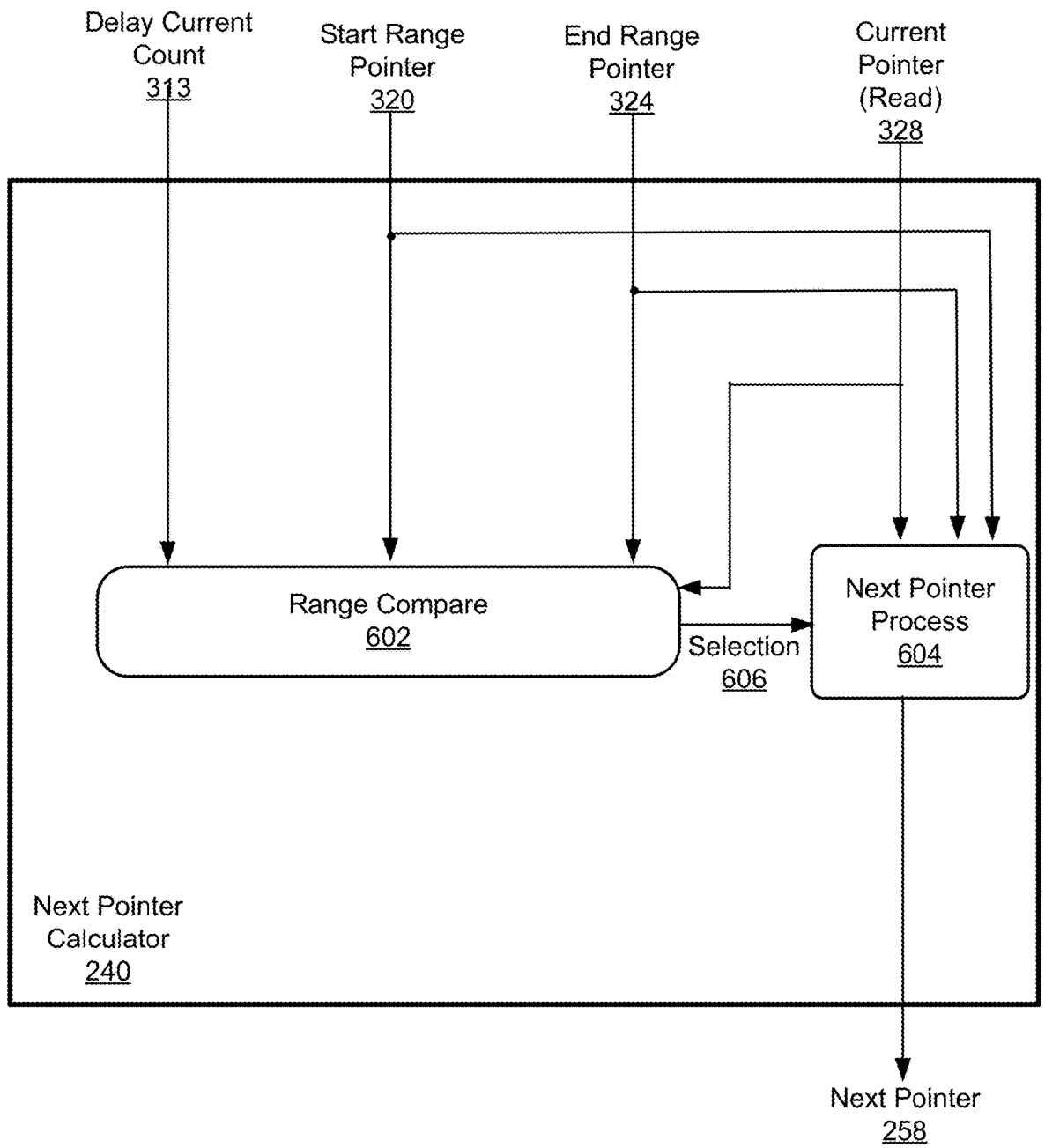
FIG. 6 illustrates a next pointer calculator, according to an embodiment of the technology disclosed.

FIG. 6 illustrates some details of Next Pointer Calculator 240, according to an embodiment of the technology disclosed. As described above, Next Pointer Calculator 240 receives delay current count 313, start range pointer 320, end range pointer 324, and current pointer 328, all being provided to a Range Compare block 602. Next Pointer Calculator 240 also includes a Next Pointer Process block 604 that receives start range pointer 320, end range pointer 324, and current pointer 328. Range Compare block 602 produces a selection signal 606, based on delay current count 313, start range pointer 320, end range pointer 324, and current pointer 328, and provides the selection signal to Next Pointer Process block 604. In turn, Next Pointer Process block 604 outputs next pointer value 258.

Figure 7:
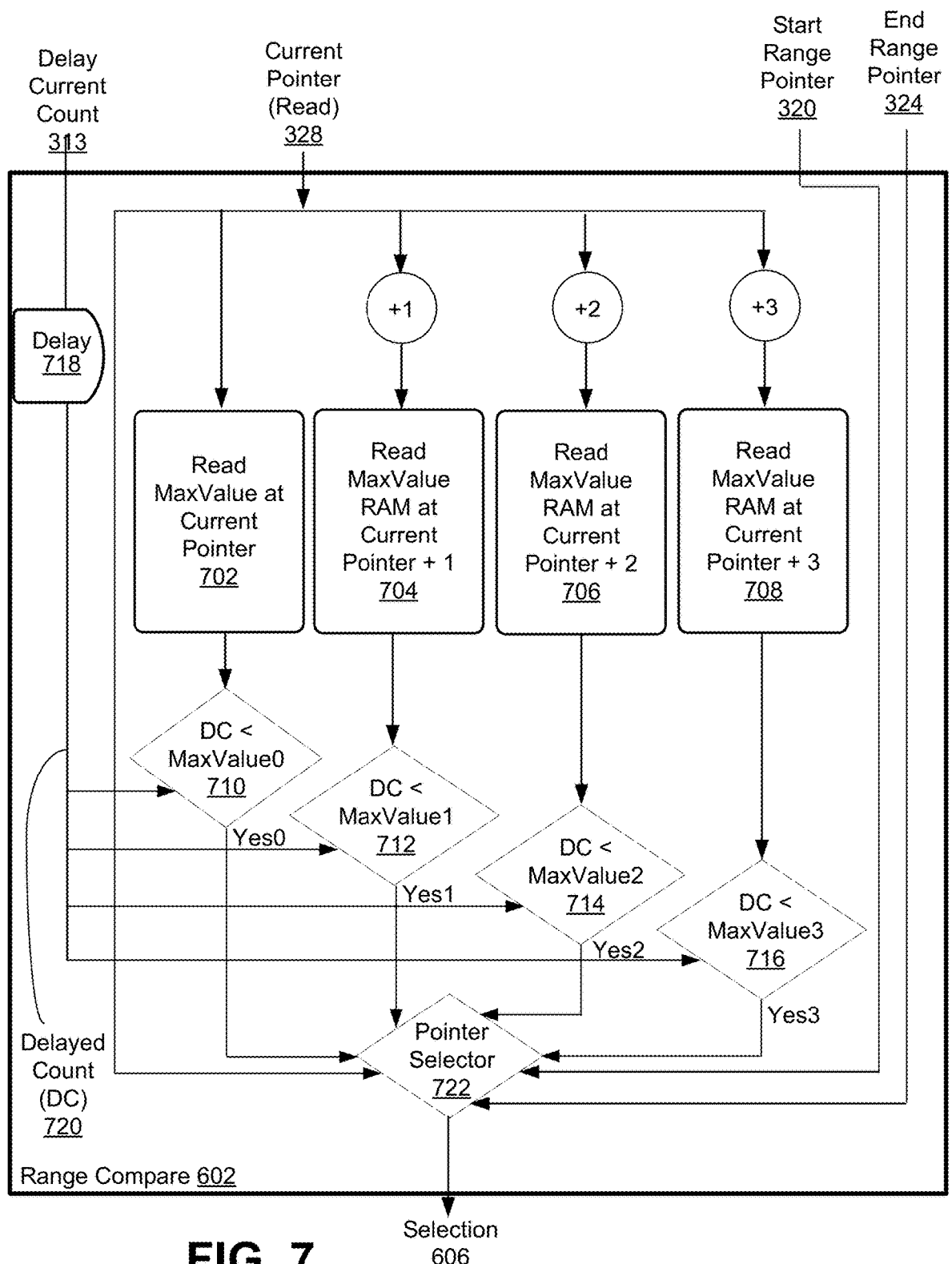
FIG. 7 illustrates a process of range comparison, according to an embodiment of the technology disclosed.

FIG. 7 illustrates some details of Range Compare block 602, according to an embodiment of the technology disclosed. Range Compare block 602 includes a read block 702, a read block 704, a read block 706, and a read block 708. As described above, Range Compare block 602 receives delay current count 313, start range pointer 320, end range pointer 324, and current pointer 328. Read block 702 receives current pointer 328 and, based on the current pointer, reads a MaxValue from a memory (e.g., a RAM functioning as a ROM on the fly). Read block 702 provides the read MaxValue as MaxValue0 to determination block 710. Read block 704 receives current pointer 328 incremented by 1 and, based on the incremented current pointer, reads a MaxValue from memory. Read block 704 provides the read MaxValue as MaxValue1 to determination block 712. Read block 706 receives current pointer 328 incremented by 2 and, based on the incremented current pointer, reads a MaxValue from memory. Read block 706 provides the read MaxValue as MaxValue2 to determination block 714. Read block 708 receives current pointer 328 incremented by 3 and, based on the incremented current pointer, reads a MaxValue from memory. Read block 708 provides the read MaxValue as MaxValue3 to determination block 716.

Delay current count 313 is provided to a delay element 718, which may be one or registers, for example, which produces a delayed count (DC) signal 720 that is provided to determination block 710, determination block 712, determination block 714, and determination block 716, each of which compare DC signal 720 to their respective corresponding MaxValue. For example, determination block 710 compares DC signal 720 to MaxValue0. If DC signal 720 is less than MaxValue0, then current pointer 328 will be provided to a pointer selector 722, which outputs selection signal 606. If DC signal 720 is not less than MaxValue0, then pointer selector 722 will output an initial value as selection signal 606. For another example, determination block 712 compares DC signal 720 to MaxValue1. If DC signal 720 is less than MaxValue1, then current pointer 328 will be provided to pointer selector 722, which outputs selection signal 606. If DC signal 720 is not less than MaxValue1, then pointer selector 722 will output an initial value as selection signal 606. For another example, determination block 714 compares DC signal 720 to MaxValue2. If DC signal 720 is less than MaxValue2, then current pointer 328 will be provided to pointer selector 722, which outputs selection signal 606. If DC signal 720 is not less than MaxValue2, then pointer selector 722 will output an initial value as selection signal 606. For yet another example, determination block 716 compares DC signal 720 to MaxValue3. If DC signal 720 is less than MaxValue3, then current pointer 328 will be provided to pointer selector 722, which outputs selection signal 606. If DC signal 720 is not less than MaxValue3, then pointer selector 722 will output an initial value as selection signal 606.

Figure 8:
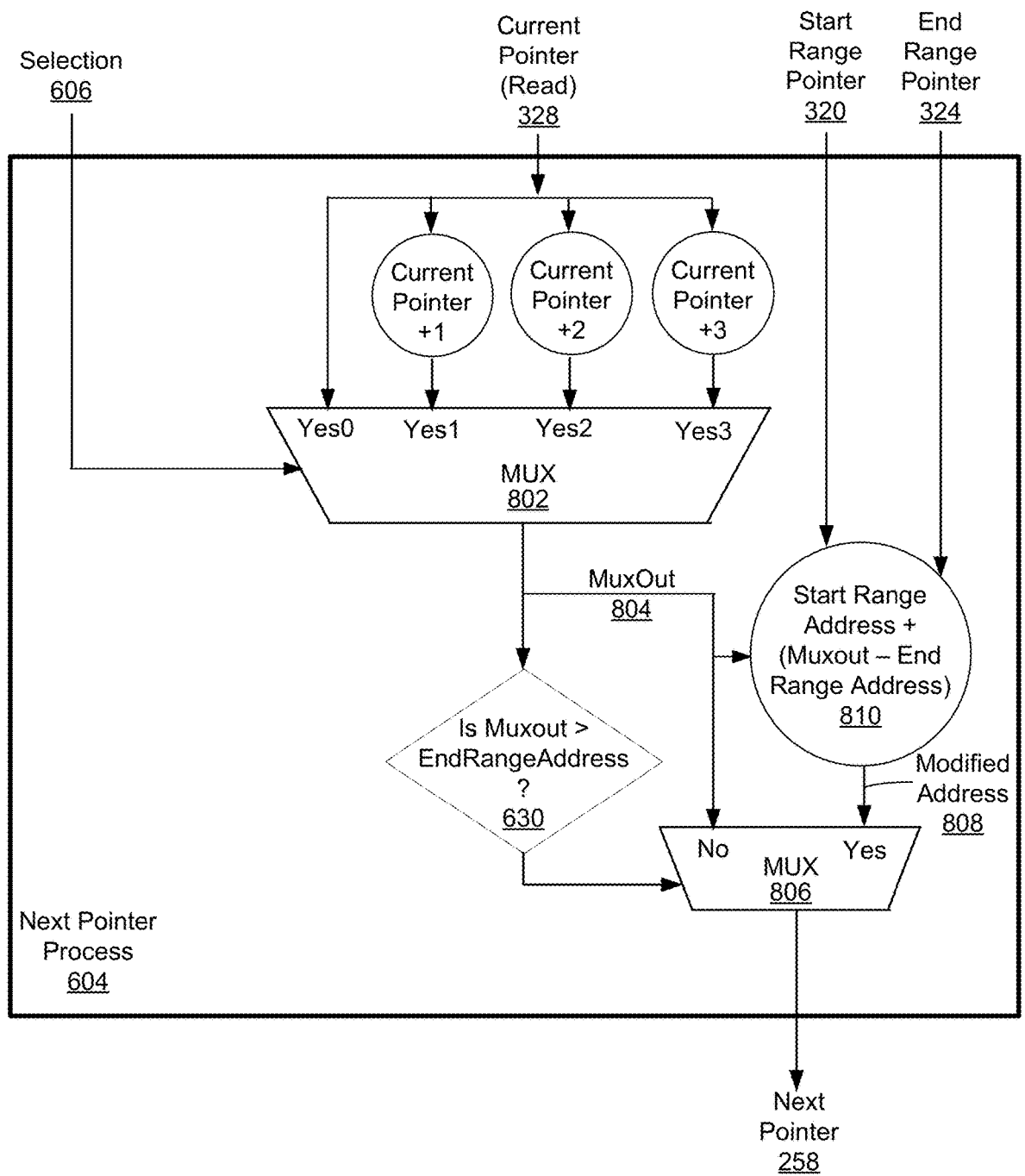
FIG. 8 illustrates a next pointer process, according to an embodiment of the technology disclosed.

FIG. 8 illustrates some details of Next Pointer Process block 604, according to an embodiment of the technology disclosed. As described above, Next Pointer Process block 604 receives start range pointer 320, end range pointer 324, current pointer 328, and selection signal 606. In particular, Next Pointer Process block 604 includes a four-input MUX 802 with inputs that receive current pointer 328, current pointer+1, current pointer+2, and current pointer +3, respectively. Selection signal 606 is applied to MUX 802 to select which of the four MUX inputs is output, as MuxOut 804, by the MUX. The four inputs of MUX 802 are based on, respectively, the outputs of determination block 710, determination block 712, determination block 714, and determination block 716.

Next Pointer Process block 604 also includes a two-input MUX 806 with inputs that receive MuxOut 804 and a modified address 808. In some implementations, modified address 808 is based on start range pointer 320, end range pointer 324, and MuxOut 804.

In particular, an Address Modifier element 810 calculates modified address 808 as start range pointer 320+MuxOut 804−end range pointer 324.

The output of MUX 806 may be determined by a determination block 812 that compares MuxOut 804 to end range pointer 324. If MuxOut 804 is greater than end range pointer 324, MUX 806 will output modified address 808, which is at the "Yes" input of MUX 806. If MuxOut 804 is not greater than end range pointer 324, MUX 806 will output MuxOut 804, which is at the "No" input of MUX 806. For either condition, the output of MUX 806 is next pointer value 258.

Figure 9:
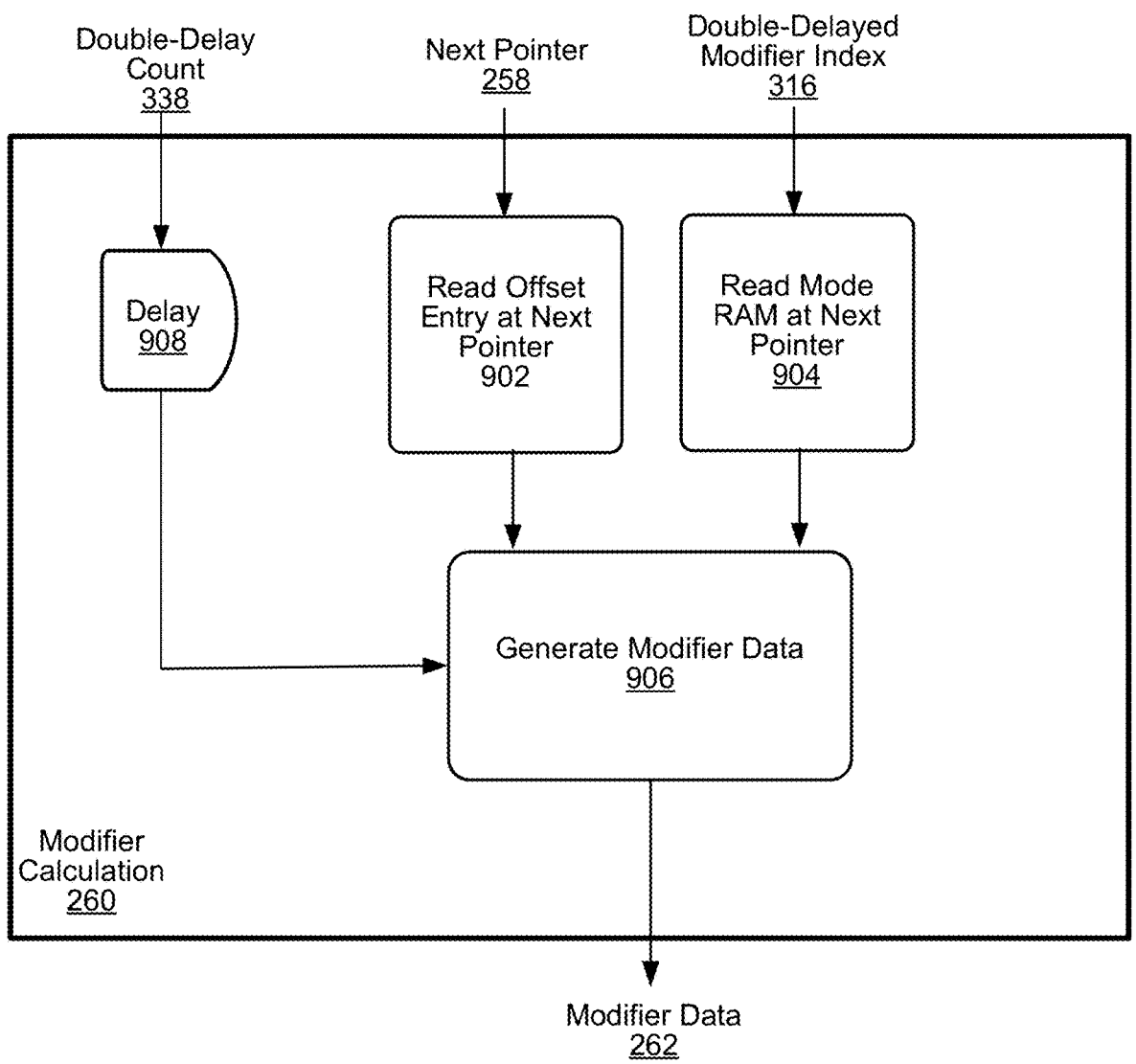
FIG. 9 illustrates a modifier calculator, according to an embodiment of the technology disclosed.

FIG. 9 illustrates some details of Modifier Calculation block 260, according to an embodiment of the technology disclosed. As described above, Modifier Calculation block 260 may receive double-delayed count 338, double-delayed modifier index 316, and next pointer value 258. Modifier Calculation block 260 includes a read block 902 and a read block 904. Read block 902 outputs an offset entry value that is read from memory based on next pointer value 258. Read block 904 outputs a mode value that is read from memory based on next pointer value 258. A Generate Modifier Data block 906 receives output from both read block 902 and read block 904. Based on this output, and based on double-delay count 338 that is further delayed by a delay element 908, Generate Modifier Data block 906 produces modifier data 262. Thus, in some embodiments, Modifier Calculation block 260 may change, based at least in part on double-delayed modifier index 316 and next pointer value 258, double-delay count 338 into data (e.g., modifier data 262) used to modify or generate a frame for a packet (e.g., convert double-delay count 338 to an IP address).

Figure 10:
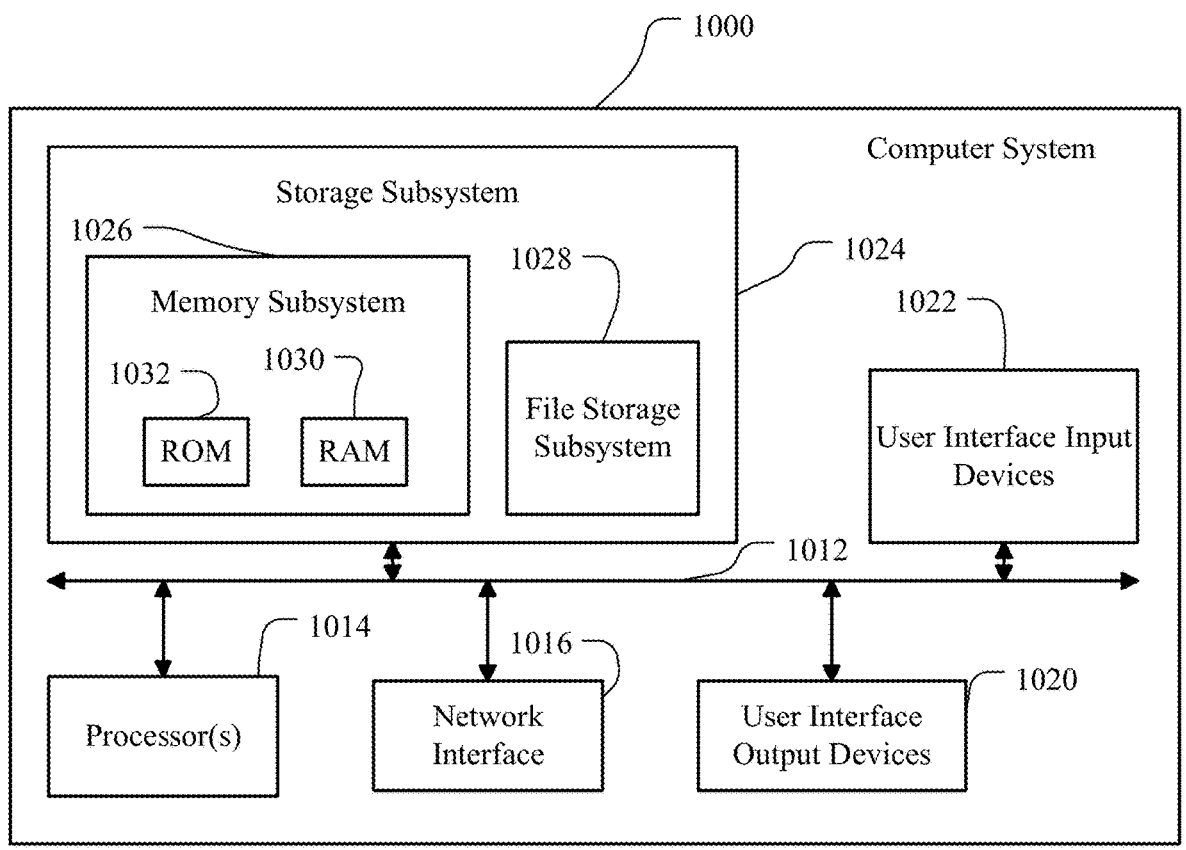
FIG. 10 illustrates a block diagram of an example computer system that implements a client state machine and/or a server state machine that performs a test on a DUT.

FIG. 10 illustrates a block diagram of an example computer system 1000 that implements a client state machine and/or a server state machine that performs a test on a DUT. This example computer system 1000 can perform the operations of the client machine 110, as illustrated in FIG. 1 and/or the operations of the server machine 120, as illustrated in FIG. 1. For example, first and second example computer systems 1000 can be used to perform the operations of the client machine 110 and the server machine 120, respectively. Alternatively, one single example computer system 1000 can perform the operations of the client machine 110, the server machine 120 and optionally the calibration and analysis tool 140, as illustrated in FIG. 1.

The computer system 1000 can include one or more processors 1014. If the computer system 1000 is performing the operations of both the client machine 110 and the server machine 120, then the computer system 1000 should ideally have 8 processor cores. However, it can be possible to implement the present technology with few than 8 processor cores. As described with reference to FIG. 4 the processors 1014 can include an individual cache for each core as well as a shared cache for the rapid generation and combination of data for creating the test packets. The processors 1014 communicate with a number of peripheral devices via bus subsystem 1012. These peripheral devices may include a storage subsystem 1024 including, for example, a memory subsystem 1026 and a file storage subsystem 1028, user interface input devices 1022, user interface output devices 1020, and a network interface 1016.

The user interface input and user interface output devices 1020, 1022 allow user interaction with computer system 1000. Network interface 1016 provides an interface to outside networks to communicate with other computer systems. The bus subsystem 1012 also includes the ports necessary to communicate with the ports on the DUT and to interface with the calibration and analysis tool 140.

User interface input devices 1022 may include: a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1000 to the user or to another machine or computer system.

Storage subsystem 1024 stores programming and data constructs that provide the functionality of some or all of the modules and methods described herein. These software modules are generally executed by the processors 1014 alone or in combination with other processors.

Memory subsystem 1026 used in the storage subsystem can include a number of memories including a main random-access memory (RAM) 1030 for storage of instructions and data during program execution and a read only memory (ROM) 1032 in which fixed instructions are stored. The file storage subsystem 1028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1028 in the storage subsystem 1024, or in other machines accessible by the processors 1014.

Bus subsystem 1012 provides a mechanism for letting the various components and subsystems of the computer system 1000 communicate with each other as intended. Although bus subsystem 1012 is shown schematically as a single bus, alternative implementations of the bus subsystem may use multiple busses.

Computer system 1000 can be of varying types including a workstation, server, computing cluster, blade server, server farm, or any other data processing system or computing device. Due to the ever-changing nature of computers and networks, the description of computer system 1000 is intended only as one example. Many other configurations of the computer system 1000 are possible having more or fewer components than the computer system depicted in FIG. 10.

SOME PARTICULAR EMBODIMENTS

The technology disclosed can be practiced as a computer implemented method of testing handling of HTTPS sessions, or other type of network traffic, of a plurality of clients with a plurality of servers by a switching, bridging or routing device (referred to as the "device or system under test" or "DUT"). It can also be practiced as a testing system including features disclosed or as an article of manufacture, such as a non-transitory computer-readable recording medium including computer program instructions adapted to carry out the methods described.

One embodiment is a method of testing handling of HTTPS sessions (e.g., or other type of network traffic) of a plurality of clients with a plurality of servers the by a switching, bridging or routing device (referred to as the "device or system under test" or "DUT"). The testing is conducted by a test system having at least first and second ports that are coupled to ports on the DUT. The environment in which this method is applied may also include a collection of DUTs that would form the "system under test." The method operates on a plurality of client state machines and a plurality of server state machines. The method includes using a plurality of client state machines running on at least four processor cores, communicating through the DUT with a plurality of server state machines running on at least four additional processor cores. For each connection established between (i) a client represented by a client state machine, of the plurality of client state machines, and (ii) a server represented by a server state machine, of the plurality of server state machines, an HTTPS session (e.g., or other type of network traffic) is set up. The HTTPS session is set up by establishing an HTTPS session between the client and the server, negotiating an encryption protocol and exchanging keys, and completing an HTTPS handshake.

The method also includes, following the setup of between 100,000 HTTPS sessions and 10,000,000 HTTPS sessions, conducting a stress test. This stress test can include generating address and packet header information in conformance with an HTTPS standard, combining patterned payload data to the generated address and packet header to form test packets without using the negotiated encryption protocol to encrypt the patterned payload data, and transmitting the test packets through the DUT. Further, the method includes compiling and reporting results of the stress test.

In one embodiment the stress test can include, prior to the combining to form the test packets, pre-fetching the patterned payload data into a processor cache of the at least four processor cores and then performing the combining without latency for retrieval of the patterned payload data from memory coupled to the at least four processor cores by a bus external to packaging of the at least four processor cores.

An embodiment can also include the processor cache into which the patterned payload data is pre-fetched being a cache that is local to only one processor core of the at least four processor cores. The processor cache into which the patterned payload data is pre-fetched is a cache that can also be local to only two processor cores of the at least four processor cores. The processor cache into which the patterned payload data is pre-fetched can be a shared cache that is shared between the at least four processor cores.

In one embodiment the client state machines can perform the generating, the combining and the transmitting operations of setting up the HTTPS session. Further, the server state machines can perform the generating, the combining and the transmitting operations of setting up the HTTPS session. Additionally, both the server state machines and the client state machines can perform the generating, the combining and the transmitting operations of setting up the HTTPS session.

An embodiment can also include setting up network connectivity between the plurality of client state machines, the DUT and the server state machines using a pre-selected or automatically selected device configuration of interface types and interface configurations. Examples of interface configurations include IPv4, IPv6, MPLS, Ethernet, VLAN, GRE, ITAG, L2TP(v2/3), PPP, PPPoX, WiMax, HDLC, AAL5, POS, IpSec, MacSec (802.1ae, 802.1af), and Fiber Channel. For the IPv4 or IPv6 interface types, the interface configuration includes a static or dynamic IP address of the emulated device and a static or dynamic gateway IP address. For the MPLS interface type, the interface configuration includes at least one MPLS label. For the PPPoX interface type, the interface configuration includes at least a session ID, and for the Ethernet interface type, the interface configuration includes at least a MAC address.

Additionally, in an embodiment, for the IPv4 or IPv6 interface type, a setup protocol for a dynamic IP address is one or more of DHCP or PPP, for the MPLS interface type, the setup protocol for an MPLS label is one or more of LDP, BGP or RSVP, and for other interfaces, which have interface address configurations that are dynamically learnt using interface setup protocols, the method exercises, as appropriate to the interface, one or more of PPPoX, L2TP, WiMax, IpSec, MacSec, or Fiber Channel.

In one embodiment the device configuration is received for the client state machines, the DUT and the server state machines and is one or more industry standard routing or switching protocols known as STP (and its variants), OSPF, RIP, BGP, LDP, BFD, EOAM, IS-IS, LACP, PIM, and RSVP.

The method, in one embodiment, can further include configuring one or more of (i) the plurality of client state machines, (ii) the DUT and (iii) the server state machines using a calibration and analysis tool. Further, in an embodiment, the method can include the calibration and analysis tool interfacing with one or more of (i) the plurality of client state machines, (ii) the DUT and (iii) the server state machines and performs quality of service (QoS) measurements. Additionally, the conducting of the stress test can further include at least one of (i) performing deep packet inspection on the test packets as they pass through the DUT and (ii) receiving results of deep packet inspection performed on the test packets as they pass through the DUT.

A device embodiment (e.g., a testing system embodiment) of the technology disclosed includes at least eight processor cores coupled to memory, the memory loaded with computer instructions to test handling of, among other things, HTTPS sessions of a multitude of clients with a plurality of servers by a switching, bridging or routing device (referred to as the "device or system under test" or "DUT"). In general, in addition to emulating HTTPS sessions, testing may also involve other types of network traffic. The testing system can further include at least first and second ports that are coupled to ports on the DUT. The environment in which this testing system operates may also include a collection of DUTs that would form the "system under test." The testing system includes a plurality of client state machines and a plurality of server state machines.

The computer instructions of the system, when executed on the at least eight processors cores, implement various actions such as using a plurality of client state machines running on at least four of the eight processor cores, communicating through the DUT with a plurality of server state machines running on at least four additional processor cores of the eight processor cores. The various actions can also include for each connection between (i) a client represented by a client state machine, of the plurality of client state machines, and (ii) a server represented by a server state machine, of the plurality of server state machines, setting up an HTTPS session. This setting up of the HTTPS session may include establishing an HTTPS session between the client and the server, negotiating an encryption protocol and exchanging keys, and completing an HTTPS handshake.

The various actions, implemented by the computer instructions of the testing system can also include following the setup of between 100,000 HTTPS sessions and 10,000,000 HTTPS sessions, conducting a stress test. The stress test can include generating address and packet header information in conformance with an HTTPS standard, combining patterned payload data to the generated address and packet header to form test packets without using the negotiated encryption protocol to encrypt the patterned payload data, and transmitting the test packets through the DUT. The various actions can also include compiling and reporting results of the stress test.

In one embodiment the stress test can include, prior to the combining to form the test packets, pre-fetching the patterned payload data into a processor cache of the at least four processor cores and then performing the combining without latency for retrieval of the patterned payload data from memory coupled to the at least four processor cores by a bus external to packaging of the at least four processor cores.

An embodiment can also include the processor cache into which the patterned payload data is pre-fetched being a cache that is local to only one processor core of the at least four processor cores. The processor cache into which the patterned payload data is pre-fetched is a cache that can also be local to only two processor cores of the at least four processor cores. The processor cache into which the patterned payload data is pre-fetched can be a shared cache that is shared between the at least four processor cores.

In one embodiment the client state machines can perform the generating, the combining and the transmitting operations of setting up the HTTPS session. Further, the server state machines can perform the generating, the combining and the transmitting operations of setting up the HTTPS session. Additionally, both the server state machines and the client state machines can perform the generating, the combining and the transmitting operations of setting up the HTTPS session.

An embodiment can also include setting up network connectivity between the plurality of client state machines, the DUT and the server state machines using an appropriate device configuration of interface types and interface configurations. Examples of interface configurations include IPv4, IPv6, MPLS, Ethernet, VLAN, GRE, ITAG, L2TP (v2/3), PPP, PPPoX, WiMax, HDLC, AAL5, POS, IpSec, MacSec (802.1ae, 802.1af), and Fiber Channel. For the IPv4 or IPv6 interface types, the interface configuration includes a static or dynamic IP address of the emulated device and a static or dynamic gateway IP address. For the MPLS interface type, the interface configuration includes at least one MPLS label. For the PPPoX interface type, the interface configuration includes at least a session ID, and for the Ethernet interface type, the interface configuration includes at least a MAC address.

Additionally, in an embodiment, for the IPv4 or IPv6 interface type, a setup protocol for a dynamic IP address is one or more of DHCP or PPP, for the MPLS interface type, the setup protocol for an MPLS label is one or more of LDP, BGP or RSVP, and for other interfaces, which have interface address configurations that are dynamically learnt using interface setup protocols, the various actions exercise, as appropriate to the interface, one or more of PPPoX, L2TP, WiMax, IpSec, MacSec, or Fiber Channel.

In one embodiment the device configuration is received for the client state machines, the DUT and the server state machines and is one or more industry standard routing or switching protocols known as STP (and its variants), OSPF, RIP, BGP, LDP, BFD, EOAM, IS-IS, LACP, PIM, and RSVP.

The various actions, in one embodiment, can further include configuring one or more of (i) the plurality of client state machines, (ii) the DUT and (iii) the server state machines using a calibration and analysis tool. Further, in an embodiment, the various actions can include the calibration and analysis tool interfacing with one or more of (i) the plurality of client state machines, (ii) the DUT and (iii) the server state machines and performs quality of service (QoS) measurements. Additionally, the conducting of the stress test can further include at least one of (i) performing deep packet inspection on the test packets as they pass through the DUT and (ii) receiving results of deep packet inspection performed on the test packets as they pass through the DUT.

The article of manufacture embodiments may be combined with the aspects and options of the methods and the testing system which are described above. All of those aspects and options apply equally to articles of manufacture that include program instructions to practice the method or to construct the device as they do to the method or device.

In some embodiments, which may use example computer system 1000, methods of generating data packets for network stress testing may include implementing an FSM feedback loop comprising steps of receiving, at an FSM parameter ROM, a new modifier index at every clock cycle, the new modifier index being an address; using the received modifier index to identify a value of a RecycleCount parameter from the FSM parameter ROM and then output the identified value of the RecycleCount parameter; receiving, at a FSM current count random access memory (RAM), the new modifier index for every clock cycle; pipelining the new modifier index through two serially arranged registers to provide a delayed version of the new modifier index to the FSM current count RAM, such that the delayed version of the new modifier index aligns timewise with the identified value of the RecycleCount parameter output from the FSM parameter ROM; reading a current count value from the FSM current count RAM based on the received modifier index; incrementing the current count value, as read from the FSM current count RAM, by a value of 1 and providing the incremented current count value to a first selector; comparing the current count value to the identified value of the RecycleCount parameter, setting a value of a ReachedEndofCycle parameter to 0 when the value of the RecycleCount parameter does not equal the current count value and setting a value of the ReachedEndofCycle parameter to 1 when the value of the RecycleCount parameter equals the current count value; utilizing the selector to output the incremented current count value when the value of the ReachedEndofCycle parameter is 0 and to output a value of 0 when the value of the ReachedEndofCycle parameter is 1; and writing the output of the selector to the FSM current count RAM.

The methods of generating data packets for network stress testing may additionally include implementing an MR-VFD feedback loop that involves receiving, at the MR-VFD parameter lookup ROM, the delayed version of the new modifier index, wherein the MR-VFD Range Entries RAM includes a MultiRangeTable parameter corresponding to each received modifier index; obtaining, from the MR-VFD parameter lookup ROM and using the delayed version of the new modifier index, MR-VFD parameters including a StartRangeTable value and an EndRangeTable value, wherein the StartRangeTable value points to a first entry of a MultiRangeTable corresponding to the received modifier index and the EndRangeTable value points to a last entry of the MultiRangeTable corresponding to the received modifier index; pipelining the output of the selector through two serially arranged registers to provide, as an updated CurrentCount, a delayed version of the output of the selector; receiving, at a comparator and at each clock cycle, the updated CurrentCount; further pipelining the delayed modifier index through two serially arranged registers to provide, as a double delayed modifier index, a delayed version of the delayed modifier index; receiving, at a MR-VFD current pointer RAM, the double delayed modifier index; obtaining a CurrentRangePointer value from the MR-VFD current point RAM based on the double delayed modifier index received at the MR-VFD current pointer RAM; at a first range RAM, reading a first range entry/value from a location corresponding to the obtained CurrentRangePointer value; at a second range RAM, if the CurrentRangePointer value minus the EndRangeTable value equals 0, then reading a second range entry/value from a location corresponding to the StartRangeTable value and if the CurrentRangePointer value minus the EndRangeTable value does not equal 0, then reading second range entry/value from a location corresponding to the CurrentRangePointer value plus 1; at a third range RAM, if the CurrentRangePointer value minus the EndRangeTable value equals 0, then reading a third range entry/value from a location corresponding to the StartRangeTable value plus 1, if the CurrentRangePointer value minus the EndRangeTable value equals 1, then reading the third range entry/value from a location in a corresponding to the StartRangeTable value, and if the CurrentRangePointer value minus the EndRangeTable value does not equal 0 and does not equal 1, then reading the third range entry/value from a location in a corresponding to the CurrentRangePointer value plus 2; at a fourth range RAM, if the CurrentRangePointer value minus the EndRangeTable value equals 0, then reading a fourth entry/value from a location corresponding to the StartRangeTable value plus 2, if the CurrentRangePointer value minus the EndRangeTable value equals 1, then reading the fourth entry/value from a location corresponding to the StartRangeTable value plus 1, if the CurrentRangePointer value minus the EndRangeTable value equals 2, then reading the fourth entry/value from a location a corresponding to the StartRangeTable value, and if the CurrentRangePointer value minus the EndRangeTable value does not equal 0, does not equal 1 and does not equal 2, then reading fourth entry/value from a location corresponding to the CurrentRangePointer value plus 3; at the comparator, comparing the updated CurrentCount to each of the first, second, third and fourth range entries/values, determining to which of the first, second, third and fourth range values/ entries the updated CurrentCount belongs and updating the CurrentRangePointer value to point to an expected correct entry the range that corresponds to a next clock cycle; at a second selector, receiving a pipeline delayed version of the ReachedEndofCycle parameter, outputting the updated CurrentRangePointer value to the MR-VFD current pointer RAM when the value of the pipeline delayed version of the ReachedEndofCycle parameter is 0, and outputting the StartRangeTable value to the MR-VFD current pointer RAM when the value of the pipeline delayed version of the ReachedEndofCycle parameter is 1, so as to set the CurrentRangePointer value within the MR-VFD current pointer RAM to be equal to the output StartRangeTable value; and generating a modifier value to be inserted into an encapsulation of a packet, the modifier value being generated based on a mode, the current count, an offset and the first, second, third or fourth range entry value.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:
1. A method of generating data packets for network stress testing, the method comprising:
storing in a memory a plurality of sets of range entries of data packet modifiers;
reading from the memory respective start and end range pointers, and determining an offset value and a maximum value, for each of the range entries of the data packet modifiers in each of the sets of range entries;
setting a pointer value;
varying a counter value;

when the counter value is not between the start and end range pointers of a range entry and is greater than the maximum value for the range entry, of the plurality of sets of range entries, of the data packet modifiers that correspond to the pointer value:
updating the pointer value to a corrected pointer value that corresponds to a different one of the range entries, of the plurality of sets of range entries of the data packet modifiers, wherein the different one of the range entries encompasses the counter value, and the counter value is less than the maximum value for the different one of the range entries; and
generating or modifying at least a portion of a header of a data packet based on the corrected pointer value and the counter value.

2. The method of claim 1, wherein generating or modifying the at least a portion of the header of the data packet based on the corrected pointer value and the counter value further comprises:
using the corrected pointer value and the counter value to retrieve from the memory a particular data packet modifier among the plurality of sets of range entries; and
generating or modifying the at least a portion of the header of the data packet based on the particular data packet modifier.

3. The method of claim 1, wherein generating or modifying the at least a portion of the header of the data packet based on the corrected pointer value and the counter value further comprises:
combining, via a mathematical operation, the counter value and a particular data packet modifier corresponding to the corrected pointer value to generate or modify the at least a portion of the header of the data packet.

4. The method of claim 3, wherein the combining, via the mathematical operation, generates an address to a lookup table stored in the memory, the method further comprising:
based on the address, retrieving from the memory a particular value from the lookup table; and
modifying the at least a portion of the header of the data packet based on the particular value.

5. The method of claim 3, further comprising:
receiving a modal input value; and
changing the mathematical operation based on the modal input value.

6. The method of claim 1, wherein the at least a portion of the header of the data packet comprises an address portion.

7. The method of claim 1, further comprising:
comparing the counter value to a threshold value;
when the counter value exceeds the threshold value, resetting the counter value to an initial value; and
repeating one or more of the reading, the setting, the varying, the updating, and the generating or modifying using the reset counter value.

8. A non-transitory computer-readable recording medium storing computer instructions thereon, the computer instructions, when executed by a processor, cause the processor to implement a method comprising:
storing in a memory a plurality of sets of range entries of data packet modifiers;
reading from the memory respective start and end range pointers, and determining an offset value and a maximum value, for each of the range entries of the data packet modifiers in each of the sets of range entries;
setting a pointer value;
varying a counter value;
when the counter value is not between the start and end range pointers of a range entry and is greater than the maximum value for the range entry, of the plurality of sets of range entries, of the data packet modifiers that correspond to the pointer value:
updating the pointer value to a corrected pointer value that corresponds to a different one of the range entries, of the plurality of sets of range entries of the data packet modifiers, wherein the different one of the range entries encompasses the counter value, and the counter value is less than the maximum value for the different one of the range entries; and
generating or modifying at least a portion of a header of a data packet based on the corrected pointer value and the counter value.

9. The non-transitory computer-readable recording medium of claim 8, wherein generating or modifying the at least a portion of the header of the data packet based on the corrected pointer value and the counter value further comprises:
using the corrected pointer value and the counter value to retrieve from the memory a particular data packet modifier among the plurality of sets of range entries; and
generating or modifying the at least a portion of the header of the data packet based on the particular data packet modifier.

10. The non-transitory computer-readable recording medium of claim 8, wherein generating or modifying the at least a portion of the header of the data packet based on the corrected pointer value and the counter value further comprises:
combining, via a mathematical operation, the counter value and a particular data packet modifier corresponding to the corrected pointer value to generate or modify the at least a portion of the header of the data packet.

11. The non-transitory computer-readable recording medium of claim 10, wherein the combining, via the mathematical operation, generates an address to a lookup table stored in the memory, and the method further comprises:
based on the address, retrieving from the memory a particular value from the lookup table; and
modifying the at least a portion of the header of the data packet based on the particular value.

12. The non-transitory computer-readable recording medium of claim 10, wherein the method further comprises:
receiving a modal input value; and
changing the mathematical operation based on the modal input value.

13. The non-transitory computer-readable recording medium of claim 8, wherein the at least a portion of the header of the data packet comprises an address portion.

14. The non-transitory computer-readable recording medium of claim 8, wherein the method further comprises:
comparing the counter value to a threshold value;
when the counter value exceeds the threshold value, resetting the counter value to an initial value; and
repeating one or more of the reading, the setting, the varying, the updating, and the generating or modifying using the reset counter value.

15. A system comprising one or more processors and a memory, the memory storing instructions that, when executed by the one or more processors, cause the one or more processors to perform operations comprising:
storing in a memory a plurality of sets of range entries of data packet modifiers;

reading from the memory respective start and end range pointers, and determining an offset value and a maximum value, for each of the range entries of the data packet modifiers in each of the sets of range entries;

setting a pointer value;

varying a counter value;

when the counter value is not between the start and end range pointers of a range entry and is greater than the maximum value for the range entry, of the plurality of sets of range entries, of the data packet modifiers that correspond to the pointer value:

updating the pointer value to a corrected pointer value that corresponds to a different one of the range entries, of the plurality of sets of range entries of the data packet modifiers, wherein the different one of the range entries encompasses the counter value, and the counter value is less than the maximum value for the different one of the range entries; and generating or modifying at least a portion of a header of a data packet based on the corrected pointer value and the counter value.

16. The system of claim 15, wherein generating or modifying the at least a portion of the header of the data packet based on the corrected pointer value and the counter value further comprises:

using the corrected pointer value and the counter value to retrieve from the memory a particular data packet modifier among the plurality of sets of range entries; and generating or modifying the at least a portion of the header of the data packet based on the particular data packet modifier.

17. The system of claim 15, wherein generating or modifying the at least a portion of the header of the data packet based on the corrected pointer value and the counter value further comprises:

combining, via a mathematical operation, the counter value and a particular data packet modifier corresponding to the corrected pointer value to generate or modify the at least a portion of the header of the data packet.

18. The system of claim 17, wherein the combining, via the mathematical operation, generates an address to a lookup table stored in the memory, and the operations further comprise:

based on the address, retrieving from the memory a particular value from the lookup table; and modifying the at least a portion of the header of the data packet based on the particular value.

19. The system of claim 17, wherein the operations further comprise:

receiving a modal input value; and changing the mathematical operation based on the modal input value.

20. The system of claim 15, wherein the at least a portion of the header of the data packet comprises an address portion.

* * * * *